US012239965B2

(12) United States Patent
Parvulescu et al.

(10) Patent No.: US 12,239,965 B2
(45) Date of Patent: Mar. 4, 2025

(54) PROCESS FOR THE PRODUCTION OF A ZEOLITIC MATERIAL HAVING AN AEI-TYPE FRAMEWORK STRUCTURE VIA SOLVENT-FREE INTERZEOLITIC CONVERSION

(71) Applicant: BASF SE, Ludwigshafen Am Rhein (DE)

(72) Inventors: Andrei-Nicolae Parvulescu, Ludwigshafen (DE); Yu Dai, Shanghai (CN); Stefan Maurer, Shanghai (CN); Ulrich Mueller, Ludwigshafen (DE); Indre Thiel, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 186 days.

(21) Appl. No.: 17/309,182

(22) PCT Filed: Nov. 15, 2019

(86) PCT No.: PCT/CN2019/118884
§ 371 (c)(1),
(2) Date: May 4, 2021

(87) PCT Pub. No.: WO2020/098796
PCT Pub. Date: May 22, 2020

(65) Prior Publication Data
US 2021/0370278 A1    Dec. 2, 2021

(51) Int. Cl.
*C01B 39/48*     (2006.01)
*B01D 53/94*     (2006.01)
*B01J 29/76*     (2006.01)
*B01J 35/61*     (2024.01)
*B01J 37/08*     (2006.01)
*B01J 37/30*     (2006.01)

(52) U.S. Cl.
CPC .......... *B01J 29/76* (2013.01); *B01D 53/9418* (2013.01); *B01J 35/617* (2024.01); *B01J 37/082* (2013.01); *B01J 37/30* (2013.01); *C01B 39/48* (2013.01); *B01D 2255/50* (2013.01); *B01J 2229/18* (2013.01); *C01P 2004/03* (2013.01)

(58) Field of Classification Search
None
See application file for complete search history.

(56) References Cited

U.S. PATENT DOCUMENTS

| | | |
|---|---|---|
| 5,958,370 A | 9/1999 | Zones |
| 2015/0118150 A1 | 4/2015 | Yang et al. |
| 2016/0264428 A1* | 9/2016 | Moulton ................ C01B 39/48 |
| 2017/0056868 A1 | 3/2017 | Ojo et al. |
| 2018/0141001 A1 | 5/2018 | Corma Canós et al. |
| 2022/0274088 A1* | 9/2022 | Fu .......................... B01J 20/186 |

FOREIGN PATENT DOCUMENTS

| | | |
|---|---|---|
| CN | 103183354 A | 7/2013 |
| CN | 108137332 A | 6/2018 |
| CN | 106 745 031 A | 5/2019 |
| DE | 102014117754 * | 6/2015 |
| ES | 2 286 775 A1 | 10/2016 |
| GB | 2556291 * | 10/2013 |
| WO | 2013176227 * | 11/2013 |
| WO | WO-2016/149234 A1 | 9/2016 |
| WO | WO 2016166247 A1 | 10/2016 |
| WO | WO 2017/134006 A1 | 8/2017 |
| WO | WO-2018/113566 A1 | 6/2018 |
| WO | WO-2019/219629 A1 | 11/2019 |
| WO | WO-2020/053191 A1 | 3/2020 |

OTHER PUBLICATIONS

European Search Report for EP Patent Application No. 19152494.1, Issued on Jul. 2, 2019, 3 pages.
Dusselier, M. et al in ACS Catal. 2015, 5, 10, 6078-6085.
Martin, N. et al in Chem. Commun. 2015, 51, 11030-11033.
Maruo, T. et al in Chem. Lett. 2014, 43, p. 302-304.
Moliner, M. et al in Chem. Commun. 2012, 48, pp. 8264-8266.
Ransom, R. et al in Ind. Eng. Chem. Res. 2017, 56, 4350-4356.
International Search Report, for International Application No. PCT/CN2019/118884, dated Feb. 12, 2020.

* cited by examiner

*Primary Examiner* — Sheng H Davis
(74) *Attorney, Agent, or Firm* — DLA Piper LLP (US)

(57) ABSTRACT

The present disclosure relates to a process preparing a zeolitic material having an AEI-type framework structure, wherein the framework structure comprises $SiO_2$ and $X_2O_3$ and X is a trivalent element, and wherein the process comprises:
(1) preparing a mixture comprising one or more cationic structure directing agents comprising a heterocyclic amine ring, seed crystals, and a first zeolitic material comprising $SiO_2$ and $X_2O_3$ in its framework structure and having an FAU-type framework structure; and
(2) heating the mixture to obtain a second zeolitic material comprising $SiO_2$ and $X_2O_3$ in its framework structure and having an AEI-type framework structure.

7 Claims, 13 Drawing Sheets

01a25k SE     1 μm

01b25k SE     1 μm

03d25k SE　　　　　　　　　1 μm

03f25k SE　　　　　　　　　1 μm

04a15k SE     2 µm

04m15k SE     2 µm ns, respectively. WO 2016/149234 A1 and Ransom, R. et al. in Ind. Eng. Chem. Res. 2017, 56, 4350-4356 respectively relate to the synthesis of SSZ-39 via interzeolitic conversion of faujasite using N,N-dimethyl-3,5-dimethylpiperidinium cations as the organotemplate. WO 2018/113566 A1, on the other hand, relates to the synthesis of zeolites via solvent-free interzeolitic conversion, wherein the synthesis of SSZ-39 from interzeolitic conversion of zeolite Y using N,N-dimethyl-2,6-dimethylpiperidinium cations is described.

PROCESS FOR THE PRODUCTION OF A ZEOLITIC MATERIAL HAVING AN AEI-TYPE FRAMEWORK STRUCTURE VIA SOLVENT-FREE INTERZEOLITIC CONVERSION

This application is a U.S. national phase entry application under 35 U.S.C. § 371 from PCT International Application No. PCT/CN2019/118884, filed Nov. 15, 2019, which claims priority to PCT International Application No. PCT/CN2018/115895, filed Nov. 16, 2018; the contents of each application is incorporated herein by reference in its entirety.

TECHNICAL FIELD

The present invention relates to a process for the preparation of a zeolitic material comprising $SiO_2$ and $X_2O_3$ in it framework structure, wherein X stands for a trivalent element, wherein said process comprises the interzeolitic conversion of a first zeolitic material comprising $SiO_2$ and $X_2O_3$ in its framework structure, wherein the first zeolitic material has an FAU-type framework structure, to a second zeolitic material comprising $SiO_2$ and $X_2O_3$ in its framework structure, wherein the second zeolitic material has an AEI-type framework structure. Furthermore, the present invention relates to a zeolitic material having an AEI-type framework structure as obtainable and/or obtained according to the inventive process, as well as to a zeolitic material having an AEI-type framework structure per se, and to their respective use, in particular as a molecular sieve, as an adsorbent, for ion-exchange, or as a catalyst and/or as a catalyst support.

INTRODUCTION

Zeolitic materials having framework type AEI are known to be potentially effective as catalysts or catalyst components for treating combustion exhaust gas in industrial applications, for example for converting nitrogen oxides ($NO_x$) in an exhaust gas stream. Synthetic AEI zeolitic materials are generally produced by precipitating crystals of the zeolitic material from a synthesis mixture which contains the sources of the elements from which the zeolitic framework is built, such as a source of silicon and a source of aluminum. An alternative approach may be the preparation via zeolitic framework conversion according to which a starting material which is a suitable zeolitic material having a framework type other than AEI is suitably reacted to obtain the zeolitic material having framework type AEI.

Thus, U.S. Pat. No. 5,958,370 relates to SSZ-39 and to its preparation using cyclic or polycyclic quaternary ammonium cations as templating agent. Moliner, M. et al. in Chem. Commun. 2012, 48, pages 8264-8266, on the other hand, concerns Cu—SSZ-39 and its use for the SCR of nitrogen oxides NOx, wherein the SSZ-39 is produced with the use of N,N-dimethyl-3,5-dimethylpiperidinium cations as the organotemplate. Maruo, T. et al. in Chem. Lett. 2014, 43, page 302-304 relates to the synthesis of AEI zeolites by hydrothermal conversion of FAU zeolites in the presence of tetraethylphosphonium cations. Martin, N. et al. in Chem. Commun. 2015, 51, 11030-11033 concerns the synthesis of Cu—SSZ-39 and its use as a catalyst in the SCR of nitrogen oxides NOx. As regards the methods of synthesis of the SSZ-39 zeolite in said document, these include the use of N,N-dimethyl-3,5-dimethylpiperidinium cations as well as of tetraethylphosphonium cations. Dusselier, M. et al. in ACS Catal. 2015, 5, 10, 6078-6085, on the other hand, describe methanol to olefin catalysis using hydrothermally treated SSZ-39.

US 2015/0118150 A1 describes zeolite synthesis methods involving the use of N,N-dimethyl-3,5-dimethylpiperidinium and N,N-dimethyl-2,6-dimethylpiperidinium cations, respectively. WO 2016/149234 A1 and Ransom, R. et al. in Ind. Eng. Chem. Res. 2017, 56, 4350-4356 respectively relate to the synthesis of SSZ-39 via interzeolitic conversion of faujasite using N,N-dimethyl-3,5-dimethylpiperidinium cations as the organotemplate. WO 2018/113566 A1, on the other hand, relates to the synthesis of zeolites via solvent-free interzeolitic conversion, wherein the synthesis of SSZ-39 from interzeolitic conversion of zeolite Y using N,N-dimethyl-2,6-dimethylpiperidinium cations is described.

Despite the variety of methods known to the skilled person for the synthesis of zeolites having an AEI-type framework structure, there remains the need for methods leading to new and improved zeolitic materials of the aforementioned structure. In particular, there remains the need for synthesis methods allowing for a tailoring of the physical and/or chemical properties of zeolitic materials having an AEI-type framework structure in view of providing materials with novel properties leading to improved results in known applications and furthermore allowing for their use in novel applications.

DETAILED DESCRIPTION

It was therefore the object of the present invention to provide an improved synthesis methodology for the production of zeolitic materials having an AEI-type framework structure with novel physical and/or chemical properties, in particular relative to their catalytic properties. Thus, it has surprisingly been found that by using a reaction mixture of a specific composition, in particular a reaction mixture which are substantially solvent-free and contains a specific structure directing agent, zeolitic materials having an AEI-type framework structure displaying new and unexpected properties may be obtained. In particular, it has quite unexpectedly been found that a specific synthetic methodology may lead to a zeolitic material having an AEI-type framework structure, wherein the primary crystals display a surprisingly high aspect ratio. As a result, the zeolitic materials of the present invention display a substantially higher surface to volume ratio which leads to a higher exchange rate between the bulk of the zeolitic material and its environment, and may thus considerably increase the activity of the catalyst compared to conventional zeolitic materials displaying a low aspect ratio, and therefore a low ratio of surface to volume ratio. Furthermore, due to the symmetry of the AEI-type framework, new and unexpected reactivities ensue from the fact that the primary crystals display short diffusion paths along one axis of the framework structure and long diffusion paths along one or both of the other axes, i.e. within the plane formed by the other axes in the latter case. In particular, it has quite unexpectedly been found that when used as a catalyst in the methanol to olefin reaction, substantial selectivity improvements towards propylene are achieved, wherein it is tentatively assumed that said unexpected advantages are due to the shorter diffusion paths in the primary crystals, in particular along the uniquely shorter axis of the inventive materials.

The present invention therefore relates to a process for the preparation of a zeolitic material having an AEI-type framework structure comprising $SiO_2$ and $X_2O_3$ in its framework structure, wherein X stands for a trivalent element, wherein said process comprises:

(1) preparing a mixture comprising one or more cationic structure directing agents, seed crystals, and a first zeolitic material comprising $SiO_2$ and $X_2O_3$ in its framework structure and having an FAU-type framework structure;

(2) heating the mixture obtained in (1) for obtaining a second zeolitic material comprising $SiO_2$ and $X_2O_3$ in its framework structure and having an AEI-type framework structure;

wherein the mixture prepared in (1) and heated in (2) contains 1000 wt.-% or less of $H_2O$ based on 100 wt.-% of $SiO_2$ in the framework structure of the first zeolitic material, and wherein the one or more cationic structure directing agents are selected from the group consisting of N,N-di($C_1$-$C_4$)alkyl-3,5-di($C_1$-$C_4$)alkylpyrrolidinium, N,N-di($C_1$-$C_4$)alkyl-3,5-di($C_1$-$C_4$)alkylpiperidinium, N,N-di($C_1$-$C_4$)alkyl-3,5-di($C_1$-$C_4$)alkylhexahydroazepinium, and mixtures of two or more thereof.

Further, the present invention relates to a zeolitic material having an AEI-type framework structure obtainable and/or obtained according to the process as disclosed herein.

Yet further, the present invention relates to a zeolitic material having an AEI-type framework structure comprising $SiO_2$ and $X_2O_3$ in its framework structure, wherein X stands for a trivalent element, and wherein the primary crystals of the zeolitic material display a mean aspect ratio of greater than 3.6.

Yet further, the present invention relates to a use of a zeolitic material as disclosed herein as a molecular sieve, as an adsorbent, for ion-exchange, or as a catalyst and/or as a catalyst support.

It is preferred that the mixture prepared in (1) and heated in (2) contains 1 to 500 weight-% (also abbreviated as wt.-% herein), more preferably 5 to 400 wt.-%, more preferably 10 to 350 wt.-%, more preferably 20 to 300 wt.-%, more preferably 30 to 250 wt.-%, more preferably 40 to 210 wt.-%, more preferably 50 to 180 wt.-%, more preferably 60 to 150 wt.-%, more preferably 70 to 130 wt.-%, more preferably 80 to 120 wt.-%, more preferably 90 to 110 wt.-%, and more preferably 95 to 105 wt.-% or less of $H_2O$ based on 100 wt.-% of $SiO_2$ contained in the framework structure of the first zeolitic material.

As regards the amount of seed crystals in the mixture prepared in (1) and heated in (2), no particular restriction applies. It is preferred that the amount of seed crystals in the mixture prepared in (1) and heated in (2) ranges from 3 to 12 wt.-% based on 100 wt.-% of $SiO_2$ in the framework structure of the first zeolitic material, more preferably from 3.5 to 10 wt.-%, more preferably from 4 to 9 wt.-%, more preferably from 4.5 to 7 wt.-%, and more preferably from 5 to 6 wt.-% based on 100 wt.-% of $SiO_2$ in the framework structure of the first zeolitic material.

It is preferred that the first zeolitic material having an FAU-type framework structure is selected from the group consisting of ZSM-3, Faujasite, [Al—Ge—O]-FAU, CSZ-1, ECR-30, Zeolite X, Zeolite Y, LZ-210, SAPO-37, ZSM-20, Na—X, US—Y, Na—Y, [Ga—Ge—O]-FAU, Li-LSX, [Ga—Al—Si—O]-FAU, and [Ga—Si—O]-FAU, including mixtures of two or more thereof, more preferably from the group consisting of ZSM-3, Faujasite, CSZ-1, ECR-30, Zeolite X, Zeolite Y, LZ-210, ZSM-20, Na—X, US—Y, Na—Y, and Li-LSX, including mixtures of two or more thereof, more preferably from the group consisting of Faujasite, Zeolite X, Zeolite Y, Na—X, US—Y, and Na—Y, including mixtures of two or more thereof, more preferably from the group consisting of Faujasite, Zeolite X, and Zeolite Y, including mixtures of two or more thereof, wherein more preferably the first zeolitic material having an FAU-type framework structure comprises zeolite X and/or zeolite Y, preferably zeolite Y, wherein more preferably the first zeolitic material having an FAU-type framework structure is zeolite X and/or zeolite Y, preferably zeolite Y.

It is preferred that the second zeolitic material obtained in (2) having an AEI-type framework structure is selected from the group consisting of SSZ-39, SAPO-18, SIZ-8, including mixtures of two or more thereof, wherein more preferably the second zeolitic material obtained in (2) comprises SSZ-39, and wherein more preferably the second zeolitic material obtained in (2) is SSZ-39.

As regards the one or more cationic structure directing agents, no particular restriction applies. It is preferred that the one or more cationic structure directing agents are selected from the group consisting of N,N-di($C_1$-$C_4$)alkyl-3,5-di($C_1$-$C_4$)alkylpyrrolidinium, N,N-di($C_1$-$C_4$)alkyl-3,5-di($C_1$-$C_4$)alkylpiperidinium, N,N-di($C_1$-$C_4$)alkyl-3,5-di($C_1$-$C_4$)alkylhexahydroazepinium, and mixtures of two or more thereof, more preferably from the group consisting of N,N-di($C_1$-$C_3$)alkyl-3,5-di($C_1$-$C_3$)alkylpyrrolidinium, N,N-di($C_1$-$C_3$)alkyl-3,5-di($C_1$-$C_3$)alkylpiperidinium, N,N-di($C_1$-$C_3$)alkyl-3,5-di($C_1$-$C_3$)alkylhexahydroazepinium, and mixtures of two or more thereof, more preferably from the group consisting of N,N-di($C_1$-$C_2$)alkyl-3,5-di($C_1$-$C_2$)alkylpyrrolidinium, N,N-di($C_1$-$C_2$)alkyl-3,5-di($C_1$-$C_2$)alkylpiperidinium, N,N-di($C_1$-$C_2$)alkyl-3,5-di($C_1$-$C_2$)alkylhexahydroazepinium, and mixtures of two or more thereof, more preferably from the group consisting of N,N-di($C_1$-$C_2$)alkyl-3,5-di($C_1$-$C_2$)alkylpiperidinium, and mixtures of two or more thereof. It is particularly preferred that the one or more cationic structure directing agents comprises N,N-dimethyl-3,5-dimethylpiperidinium, wherein more preferably the one or more cationic structure directing agents consists of N,N-dimethyl-3,5-dimethylpiperidinium.

As regards the isomeric form of the one or more cationic structure directing agents in particular relative to the alkyl groups at the 3 and 5 positions of the heterocyclic amine ring, no particular restriction applies. Thus, the one or more cationic structure directing agents may be present in any isomeric form or mixture of isomeric forms. It is preferred that the molar ratio of the trans isomer to the cis isomer in the one or more cationic structure directing agents relative to the alkyl groups at the 3 and 5 positions of the heterocyclic amine ring is in the range of from 0.01 to 0.95, preferably of from 0.03 to 0.9, more preferably of from 0.05 to 0.7, more preferably of from 0.07 to 0.5, more preferably of from 0.09 to 0.4, more preferably of from 0.11 to 0.3, more preferably of from 0.13 to 0.25, more preferably of from 0.15 to 0.22, more preferably of from 0.16 to 0.2, and more preferably of from 0.17 to 0.18.

The one or more cationic structure directing agents may be provided in any conceivable form. It is preferred that the one or more cationic structure directing agents are provided as salts, more preferably as one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more cationic structure directing agents are provided as hydroxides and/or bromides, and more preferably as hydroxides.

As regards X, it is preferred that X is selected from the group consisting of Al, B, In, Ga, and mixtures of two or more thereof. It is particularly preferred that X is Al and/or B, and more preferably Al.

It is preferred that, independently from one another in particular in the case where the framework structure of the first zeolitic material comprises more than one material, the framework structure of the first zeolitic material displays a $SiO_2:X_2O_3$ molar ratio ranging from 5 to 120, more preferably from 10 to 80, more preferably from 15 to 50, more preferably from 20 to 40, more preferably from 24 to 36, more preferably from 26 to 34, and more preferably from 28 to 32.

As regards the molar ratio of the one or more cationic structure directing agents to $SiO_2$ in the framework structure of the first zeolitic material in the mixture prepared in (1) and heated in (2), no particular restriction applies. It is preferred that the mixture prepared in (1) and heated in (2) displays a molar ratio of the one or more cationic structure directing agents to $SiO_2$ in the framework structure of the first zeolitic material in the range of from 0.01 to 0.5, more preferably of from 0.03 to 0.3, more preferably of from 0.05 to 0.2, more preferably of from 0.06 to 0.15, more preferably of from 0.07 to 0.12, and more preferably of from 0.08 to 0.1.

The mixture prepared in (1) and heated in (2) may comprise further components. It is preferred that the mixture prepared in (1) and heated in (2) further comprises at least one source for OH, wherein said at least one source for OH preferably comprises a metal hydroxide, more preferably a hydroxide of an alkali metal M, more preferably sodium and/or potassium hydroxide, and more preferably sodium hydroxide, wherein more preferably the at least one source for OH is sodium hydroxide.

In the case where the mixture prepared in (1) and heated in (2) further comprises hydroxide ($OH^-$), no particular restriction applies in view of the $OH^-:SiO_2$ molar ratio of $OH^-$ to $SiO_2$ in the framework structure of the first zeolitic material. It is preferred that the mixture prepared in (1) and heated in (2) displays an $OH^-:SiO_2$ molar ratio of $OH^-$ to $SiO_2$ in the framework structure of the first zeolitic material in the range of from 0.01 to 5, more preferably from 0.05 to 3, more preferably from 0.1 to 1.5, more preferably from 0.15 to 1, more preferably from 0.2 to 0.7, more preferably from 0.25 to 0.5, and more preferably from 0.3 to 0.4.

It is preferred that the heating in (2) is conducted at a temperature ranging from 80 to 250° C., more preferably from 90 to 230° C., more preferably from 100 to 210° C., more preferably from 105 to 200° C., more preferably from 110 to 190° C., more preferably from 115 to 180° C., more preferably from 120 to 170° C., more preferably from 125 to 160° C., more preferably from 130 to 150° C., and more preferably from 135 to 145° C.

Further, it is preferred that the heating in (2) is conducted for a period in the range of from 6 h to 12 d, more preferably from 12 h to 10 d, more preferably from 1 to 8 d, more preferably from 2 to 7.5 d, more preferably from 3 to 7 d, more preferably from 3.5 to 6.5 d, more preferably from 4 to 6 d, and more preferably from 4.5 to 5.5 d.

Further, it is preferred that the heating in (2) is conducted under autogenous pressure. It is particularly preferred that heating in (2) is performed in a pressure tight vessel, more preferably in an autoclave.

Therefore, it is particularly preferred that heating in (2) is conducted at a temperature ranging from 130 to 150° C., more preferably from 135 to 145° C., for a period in the range of from 4 to 6 d, more preferably from 4.5 to 5.5 d, under autogenous pressure in a pressure tight vessel, more preferably in an autoclave.

It is preferred that the process of the present invention consists of (1) and (2).

The process of the present invention may comprise further steps. It is preferred that the process further comprises
(3) calcining the second zeolitic material obtained in (2).

Thus, it is particularly preferred that the process consists of (1), (2), and (3).

It is preferred that the process further comprises
(4) subjecting the zeolitic material obtained in (2) or (3) to an ion-exchange procedure, wherein preferably one or more ionic extra-framework elements contained in the zeolite framework is ion-exchanged against H+ and/or $NH_4^+$ more preferably against $NH_4$.

Thus, it is particularly preferred that the process consists of (1), (2), (3), and (4).

In the case where the process comprises (4) as disclosed herein, it is preferred that in (4) one or more ionic extra-framework elements contained in the zeolite framework is ion-exchanged against one or more cations and/or cationic elements selected from the group consisting of Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of Sr, Cr, Mo, Fe, Co, Ni, Cu, Zn, Ag, and mixtures of two or more thereof, more preferably from the group consisting of Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the one or more cation and/or cationic elements comprise Cu and/or Fe, preferably Cu, wherein even more preferably the one or more cation and/or cationic elements consist of Cu and/or Fe, preferably of Cu, wherein the one or more ionic extra-framework elements preferably comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, more preferably Na.

Further, in the case where the process comprises (4) as disclosed herein, it is preferred that the process further comprises
(5) calcining the zeolitic material obtained in (4).

As regards the temperature of calcination in (3) and/or (5), no particular restriction applies. It is preferred that the temperature of calcination in (3) and/or (5) is in the range of from 300 to 900° C., more preferably of from 400 to 700° C., more preferably of from 450 to 650° C., and more preferably of from 500 to 600° C. It is particularly preferred that calcination in (3) and/or (5) is conducted in a gas atmosphere having a temperature in the range of from 300 to 900° C., more preferably of from 400 to 700° C., more preferably of from 450 to 650° C., and more preferably of from 500 to 600° C., wherein the gas atmosphere comprises one or more of air, dry air, oxygen, nitrogen, and a mixture of two or more thereof.

Further, it is preferred that calcining in (3) and/or (5) is conducted for a period in the range of from 0.5 to 10 h, more preferably from 1 to 15 h, more preferably from 2 to 12 h, more preferably from 2.5 to 9 h, more preferably from 3 to 7 h, more preferably from 3.5 to 6.5 h, more preferably from 4 to 6 h, more preferably from 4.5 to 5.5 h, and more preferably from 3 to 12 h.

As regards the means for preparing the mixture in (1), no particular restriction applies. It is preferred that (1) includes a step of milling the mixture.

It is preferred that the seed crystals comprise a zeolitic material having an AEI-type framework structure, wherein more preferably the zeolitic material of the seed crystals is obtainable and/or obtained according to any one of the embodiments disclosed herein.

Further, it is preferred that the zeolitic material having an AEI-type framework structure comprised in the seed crystals is selected from the group consisting of SSZ-39, SAPO-18, SIZ-8, including mixtures of two or more thereof. It is particularly preferred that the zeolitic material having an AEI-type framework structure comprised in the seed crystals is SSZ-39. As regards the preferred SSZ-39 seed crystals, these may be obtained according to any suitable synthesis, wherein it is preferred that they are obtainable or obtained, and preferably that they are obtained, according to the process described in U.S. Pat. No. 5,958,370 A, and in particular according to the examples of said document.

As disclosed above, the present invention also relates to a zeolitic material having an AEI-type framework structure obtainable and/or obtained according to the process of any of the embodiments disclosed herein.

Further, the present invention relates to a zeolitic material having an AEI-type framework structure comprising $SiO_2$ and $X_2O_3$ in its framework structure, wherein X stands for a trivalent element, and wherein the primary crystals of the zeolitic material display a mean aspect ratio of greater than 3.6, wherein the mean aspect ratio is preferably obtained by scanning electron microscopy (SEM) analysis of the zeolitic material, wherein the mean aspect ratio is more preferably obtained by scanning electron microscopy (SEM) analysis of the zeolitic material as described in the examples.

It is preferred that the primary crystals of the zeolitic material display a mean aspect ratio in the range of from 3.6 to 9, more preferably from 3.7 to 7, more preferably from 3.9 to 6, more preferably from 4.1 to 5, and more preferably from 4.3 to 4.5.

In accordance with the above, the values for the mean aspect ratio of the inventive zeolitic materials, within the meaning of the present invention, may be obtained by any suitable means, wherein preferably the mean aspect ratio is obtained by scanning electron microscopy (SEM) analysis of the inventive zeolitic materials, and more preferably by the SEM method described in the experimental section of the present application.

It is preferred that X of the zeolitic material is selected from the group consisting of Al, B, In, Ga, and mixtures of two or more thereof. It is particularly preferred that X is Al and/or B, and more preferably Al.

Further, it is preferred that the zeolitic material has an AEI-type framework structure, wherein more preferably the zeolitic material is selected from the group consisting of SSZ-39, SAPO-18, SIZ-8, including mixtures of two or more thereof. It is particularly preferred that the zeolitic material comprises SSZ-39, more preferably the zeolitic material is SSZ-39.

Further, the present invention relates to a use of a zeolitic material as disclosed herein as a molecular sieve, as an adsorbent, for ion-exchange, or as a catalyst and/or as a catalyst support.

It is preferred that the zeolitic material as disclosed herein is used as a catalyst for the selective catalytic reduction (SCR) of nitrogen oxides $NO_x$, for the storage and/or adsorption of $CO_2$, for the oxidation of $NH_3$, in particular for the oxidation of $NH_3$ slip in diesel systems; for the decomposition of $N_2O$, as an additive in fluid catalytic cracking (FCC) processes, and/or as a catalyst in organic conversion reactions, more preferably in the conversion of alcohols to olefins, more preferably in methanol to olefin (MTO) catalysis, more preferably for the selective catalytic reduction (SCR) of nitrogen oxides $NO_x$, and more preferably for the selective catalytic reduction (SCR) of nitrogen oxides $NO_x$ in exhaust gas from a combustion engine, preferably from a diesel engine or from a lean burn gasoline engine.

The present invention is further illustrated by the following embodiments and combinations of embodiments as indicated by the respective dependencies and back-references. In particular, it is noted that in each instance where a range of embodiments is mentioned, for example in the context of a term such as "The process of any of embodiments 1 to 4", every embodiment in this range is meant to be explicitly disclosed for the skilled person, i.e. the wording of this term is to be understood by the skilled person as being synonymous to "The process of any of embodiments 1, 2, 3, and 4".

1. A process for the preparation of a zeolitic material having an AEI-type framework structure comprising $SiO_2$ and $X_2O_3$ in its framework structure, wherein X stands for a trivalent element, wherein said process comprises:
   (1) preparing a mixture comprising one or more cationic structure directing agents, seed crystals, and a first zeolitic material comprising $SiO_2$ and $X_2O_3$ in its framework structure and having an FAU-type framework structure;
   (2) heating the mixture obtained in (1) for obtaining a second zeolitic material comprising $SiO_2$ and $X_2O_3$ in its framework structure and having an AEI-type framework structure;
   wherein the mixture prepared in (1) and heated in (2) contains 1000 wt.-% or less of $H_2O$ based on 100 wt.-% of $SiO_2$ in the framework structure of the first zeolitic material, preferably 1 to 500 wt.-%, more preferably 5 to 400 wt.-%, more preferably 10 to 350 wt. %, more preferably 20 to 300 wt.-%, more preferably 30 to 250 wt.-%, more preferably 40 to 210 wt.-%, more preferably 50 to 180 wt.-%, more preferably 60 to 150 wt.-%, more preferably 70 to 130 wt.-%, more preferably 80 to 120 wt.-%, more preferably 90 to 110 wt.-%, and more preferably 95 to 105 wt.-% based on 100 wt.-% of $SiO_2$ contained in the framework structure of the first zeolitic material, and
   wherein the one or more cationic structure directing agents are selected from the group consisting of N,N-di($C_1$-$C_4$)alkyl-3,5-di($C_1$-$C_4$)alkylpyrrolidinium, N,N-di($C_1$-$C_4$)alkyl-3,5-di($C_1$-$C_4$)alkylpiperidinium, N,N-di($C_1$-$C_4$)alkyl-3,5-di($C_1$-$C_4$)alkylhexahydroazepinium, and mixtures of two or more thereof.

2. The process of embodiment 1, wherein the amount of seed crystals in the mixture prepared in (1) and heated in (2) ranges from 3 to 12 wt.-% based on 100 wt.-% of $SiO_2$ in the framework structure of the first zeolitic material, preferably from 3.5 to 10 wt.-%, more preferably from 4 to 9 wt.-%, more preferably from 4.5 to 7 wt.-%, and more preferably from 5 to 6 wt.-% based on 100 wt.-% of $SiO_2$ in the framework structure of the first zeolitic material.

3. The process of embodiment 1 or 2, wherein the first zeolitic material having an FAU-type framework structure is selected from the group consisting of ZSM-3, Faujasite, [Al—Ge—O]-FAU, CSZ-1, ECR-30, Zeolite X, Zeolite Y, LZ-210, SAPO-37, ZSM-20, Na—X, US—Y, Na—Y, [Ga—Ge—O]-FAU, Li-LSX, [Ga—Al—Si—O]-FAU, and [Ga—Si—O]-FAU, including mixtures of two or more thereof, preferably from the group consisting of ZSM-3, Faujasite, CSZ-1, ECR-30, Zeolite X, Zeolite Y, LZ-210, ZSM-20, Na—X, US—Y, Na—Y, and Li-LSX, including mixtures of two or more thereof, more preferably from the group consisting of Faujasite, Zeolite X, Zeolite Y, Na—X, US—Y, and Na—Y, including mixtures of two or more thereof, more preferably from the group consisting of Faujasite, Zeolite X, and Zeolite Y, including mixtures of two or more thereof, wherein more preferably the first zeolitic material having an FAU-type framework structure comprises zeolite X and/or zeolite Y, preferably zeolite Y, wherein more preferably the first zeolitic material having an FAU-type framework structure is zeolite X and/or zeolite Y, preferably zeolite Y.

4. The process of any of embodiments 1 to 3, wherein the second zeolitic material obtained in (2) having an AEI-type framework structure is selected from the group consisting of SSZ-39, SAPO-18, SIZ-8, including mixtures of two or more thereof, wherein more preferably the second zeolitic material obtained in (2) comprises SSZ-39, and wherein more preferably the second zeolitic material obtained in (2) is SSZ-39.

5. The process of any of embodiments 1 to 4, wherein the one or more cationic structure directing agents are selected from the group consisting of N,N-di($C_1$-$C_4$)alkyl-3,5-di($C_1$-$C_4$)alkylpyrrolidinium, N,N-di($C_1$-$C_4$)alkyl-3,5-di($C_1$-$C_4$)alkylpiperidinium, N,N-di($C_1$-$C_4$)alkyl-3,5-di($C_1$-$C_4$)alkylhexahydroazepinium, and mixtures of two or more thereof, preferably from the group consisting of N,N-di($C_1$-$C_3$)alkyl-3,5-di($C_1$-$C_3$)alkylpyrrolidinium, N,N-di($C_1$-$C_3$)alkyl-3,5-di($C_1$-$C_3$)alkylpiperidinium, N,N-di($C_1$-$C_3$)alkyl-3,5-di($C_1$-$C_3$)alkylhexahydroazepinium, and mixtures of two or more thereof, more preferably from the group consisting of N,N-di($C_1$-$C_2$)alkyl-3,5-di($C_1$-$C_2$)alkylpyrrolidinium, N,N-di($C_1$-$C_2$)alkyl-3,5-di($C_1$-$C_2$)alkylpiperidinium, N,N-di($C_1$-$C_2$)alkyl-3,5-di($C_1$-$C_2$)alkylhexahydroazepinium, and mixtures of two or more thereof, more preferably from the group consisting of N,N-di($C_1$-$C_2$)alkyl-3,5-di($C_1$-$C_2$)alkylpiperidinium, and mixtures of two or more thereof, wherein more preferably the one or more cationic structure directing agents comprises N,N-dimethyl-3,5-dimethylpiperidinium, wherein more preferably the one or more cationic structure directing agents consists of N,N-dimethyl-3,5-dimethylpiperidinium.

6. The process of any of embodiments 1 to 5, wherein the molar ratio of the trans isomer to the CIS isomer in the one or more cationic structure directing agents relative to the alkyl groups at the 3 and 5 positions of the heterocyclic amine ring is in the range of from 0.01 to 0.95, preferably of from 0.03 to 0.9, more preferably of from 0.05 to 0.7, more preferably of from 0.07 to 0.5, more preferably of from 0.09 to 0.4, more preferably of from 0.11 to 0.3, more preferably of from 0.13 to 0.25, more preferably of from 0.15 to 0.22, more preferably of from 0.16 to 0.2, and more preferably of from 0.17 to 0.18.

7. The process of any of embodiments 1 to 6, wherein the one or more cationic structure directing agents are provided as salts, preferably as one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more cationic structure directing agents are provided as hydroxides and/or bromides, and more preferably as hydroxides.

8. The process of any of embodiments 1 to 7, wherein X is selected from the group consisting of Al, B, In, Ga, and mixtures of two or more thereof, X preferably being Al and/or B, and more preferably being Al.

9. The process of any of embodiments 1 to 8, wherein independently from one another, the framework structure of the first zeolitic material displays a $SiO_2$:$X_2O_3$ molar ratio ranging from 5 to 120, preferably from 10 to 80, more preferably from 15 to 50, more preferably from 20 to 40, more preferably from 24 to 36, more preferably from 26 to 34, and more preferably from 28 to 32.

10. The process of any of embodiments 1 to 9, wherein the mixture prepared in (1) and heated in (2) displays a molar ratio of the one or more cationic structure directing agents to $SiO_2$ in the framework structure of the first zeolitic material is in the range of from 0.01 to 0.5, preferably of from 0.03 to 0.3, more preferably of from 0.05 to 0.2, more preferably of from 0.06 to 0.15, more preferably of from 0.07 to 0.12, and more preferably of from 0.08 to 0.1.

11. The process of any of embodiments 1 to 10, wherein the mixture prepared in (1) and heated in (2) further comprises at least one source for $OH^-$, wherein said at least one source for $OH^-$ preferably comprises a metal hydroxide, more preferably a hydroxide of an alkali metal M, more preferably sodium and/or potassium hydroxide, and more preferably sodium hydroxide, wherein more preferably the at least one source for $OH^-$ is sodium hydroxide.

12. The process of embodiment 11, wherein the mixture prepared in (1) and heated in (2) displays an $OH^-$:$SiO_2$ molar ratio of $OH^-$ to $SiO_2$ in the framework structure of the first zeolitic material in the range of from 0.01 to 5, preferably from 0.05 to 3, more preferably from 0.1 to 1.5, more preferably from 0.15 to 1, more preferably from 0.2 to 0.7, more preferably from 0.25 to 0.5, and more preferably from 0.3 to 0.4.

13. The process of any of embodiments 1 to 12, wherein the heating in (2) is conducted at a temperature ranging from 80 to 250° C., preferably from 90 to 230° C., more preferably from 100 to 210° C., more preferably from 105 to 200° C., more preferably from 110 to 190° C., more preferably from 115 to 180° C., more preferably from 120 to 170° C., more preferably from 125 to 160° C., more preferably from 130 to 150° C., and more preferably from 135 to 145° C.

14. The process of any of embodiments 1 to 13, wherein the heating in (2) is conducted for a period in the range of from 6 h to 12 d, preferably from 12 h to 10 d, more preferably from 1 to 8 d, more preferably from 2 to 7.5 d, more preferably from 3 to 7 d, more preferably from 3.5 to 6.5 d, more preferably from 4 to 6 d, and more preferably from 4.5 to 5.5 d.

15. The process of any of embodiments 1 to 14, wherein the heating in (2) is conducted under autogenous pressure, wherein preferably heating in (2) is performed in a pressure tight vessel, preferably in an autoclave.

16. The process of any of embodiments 1 to 15, further comprising
    (3) calcining the second zeolitic material obtained in (2).
17. The process of any of embodiments 1 to 16, further comprising
    (4) subjecting the zeolitic material obtained in (2) or (3) to an ion-exchange procedure, wherein preferably one or more ionic extra-framework elements contained in the zeolite framework is ion-exchanged against $H^+$ and/or $NH_4^+$, more preferably against $NH_4$.
18. The process of embodiment 17, wherein in (4) one or more ionic extra-framework elements contained in the zeolite framework is ion-exchanged against one or more cations and/or cationic elements selected from the group consisting of Sr, Zr, Cr, Mg, Mo, Fe, Co, Ni, Cu, Zn, Ru, Rh, Pd, Ag, Os, Ir, Pt, Au, and mixtures of two or more thereof, preferably from the group consisting of Sr, Cr, Mo, Fe, Co, Ni, Cu, Zn, Ag, and mixtures of two or more thereof, more preferably from the group consisting of Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the one or more cation and/or cationic elements comprise Cu and/or Fe, preferably Cu, wherein even more preferably the one or more cation and/or cationic elements consist of Cu and/or Fe, preferably of Cu;
    wherein the one or more ionic extra-framework elements preferably comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, more preferably Na.
19. The process of embodiment 17 or 18, further comprising
    (5) calcining the zeolitic material obtained in (4).
20. The process of any of embodiments 16 to 19, wherein the temperature of calcination in (3) and/or (5) is in the range of from 300 to 900° C., preferably of from 400 to 700° C., more preferably of from 450 to 650° C., and more preferably of from 500 to 600° C.
21. The process of any of embodiments 16 to 20, wherein calcining in (3) and/or (5) is conducted for a period in the range of from 0.5 to 10 h, preferably from 1 to 15 h, more preferably from 2 to 12 h, more preferably from 2.5 to 9 h, more preferably from 3 to 7 h, more preferably from 3.5 to 6.5 h, more preferably from 4 to 6 h, more preferably from 4.5 to 5.5 h, and more preferably from 3 to 12 h.
22. The process of any of embodiments 1 to 21, wherein (1) includes a step of milling the mixture.
23. The process of any of embodiments 1 to 22, wherein the seed crystals comprise a zeolitic material having an AEI-type framework structure, wherein preferably the zeolitic material of the seed crystals is obtainable and/or obtained according to any one of embodiments 1 to 22.
24. The process of embodiment 23, wherein the zeolitic material having an AEI-type framework structure comprised in the seed crystals is selected from the group consisting of SSZ-39, SAPO-18, SIZ-8, including mixtures of two or more thereof, wherein preferably the zeolitic material having an AEI-type framework structure comprised in the seed crystals is SSZ-39.
25. A zeolitic material having an AEI-type framework structure obtainable and/or obtained according to the process of any of embodiments 1 to 24.
26. A zeolitic material having an AEI-type framework structure comprising $SiO_2$ and $X_2O_3$ in its framework structure, wherein X stands for a trivalent element, and wherein the primary crystals of the zeolitic material display a mean aspect ratio of greater than 3.6, and preferably a mean aspect ratio in the range of from 3.6 to 9, more preferably from 3.7 to 7, more preferably from 3.9 to 6, more preferably from 4.1 to 5, and more preferably from 4.3 to 4.5.
27. The zeolitic material of embodiment 26, wherein X is selected from the group consisting of Al, B, In, Ga, and mixtures of two or more thereof, X preferably being Al and/or B, and more preferably being Al.
28. The zeolitic material of embodiment 26 or 27, wherein the zeolitic material having an AEI-type framework structure, wherein preferably the zeolitic material is selected from the group consisting of SSZ-39, SAPO-18, SIZ-8, including mixtures of two or more thereof, wherein more preferably the zeolitic material comprises SSZ-39, and wherein more preferably the zeolitic material is SSZ-39.
29. Use of a zeolitic material according to any of embodiments 25 to 28 as a molecular sieve, as an adsorbent, for ion-exchange, or as a catalyst and/or as a catalyst support, preferably as a catalyst for the selective catalytic reduction (SCR) of nitrogen oxides $NO_R$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides $NO_x$ in exhaust gas from a combustion engine, preferably from a diesel engine or from a lean burn gasoline engine.

EXAMPLES

Measurement of the SEM Images

The SEM images were measured with secondary electrons at 5 kV for providing topographic images. The samples were mounted for measurement using Leit-C Plast and were coated with around 8 nm Pt.

Determination of the Aspect Ratio

For determining the aspect ratio of the primary crystals of the zeolitic materials, zeolite primary crystallites oriented perpendicular to the electron probe were selected manually in the SEM images for evaluation. Both accessible dimensions for a given crystal (i.e. width and height of the crystal) were measured and documented for each particle. The procedure was conducted on as many SEM images displaying different portions of the surface of the sample as necessary for obtaining values for at least 120 different particles, preferably for at least 150 different particles, and more preferably for at least 200 different particles. The mean value of the aspect ratio, i.e. the ratio of the width to the height of each particle, obtained for all of the measured particles constituted then the mean aspect ratio of the sample.

Measurement of the x-Ray Diffraction Patterns

Powder X-ray diffraction (PXRD) data was collected using a diffractometer (D8 Advance Series II, Bruker AXS GmbH) equipped with a LYNXEYE detector operated with a Copper anode X-ray tube running at 40 kV and 40 mA. The geometry was Bragg-Brentano, and air scattering was reduced using an air scatter shield. The crystallinity was determined using DIFFRAC.EVA software (User Manual for DIFFRAC.EVA, Bruker AXS GmbH, Karlsruhe).

Figure 9:
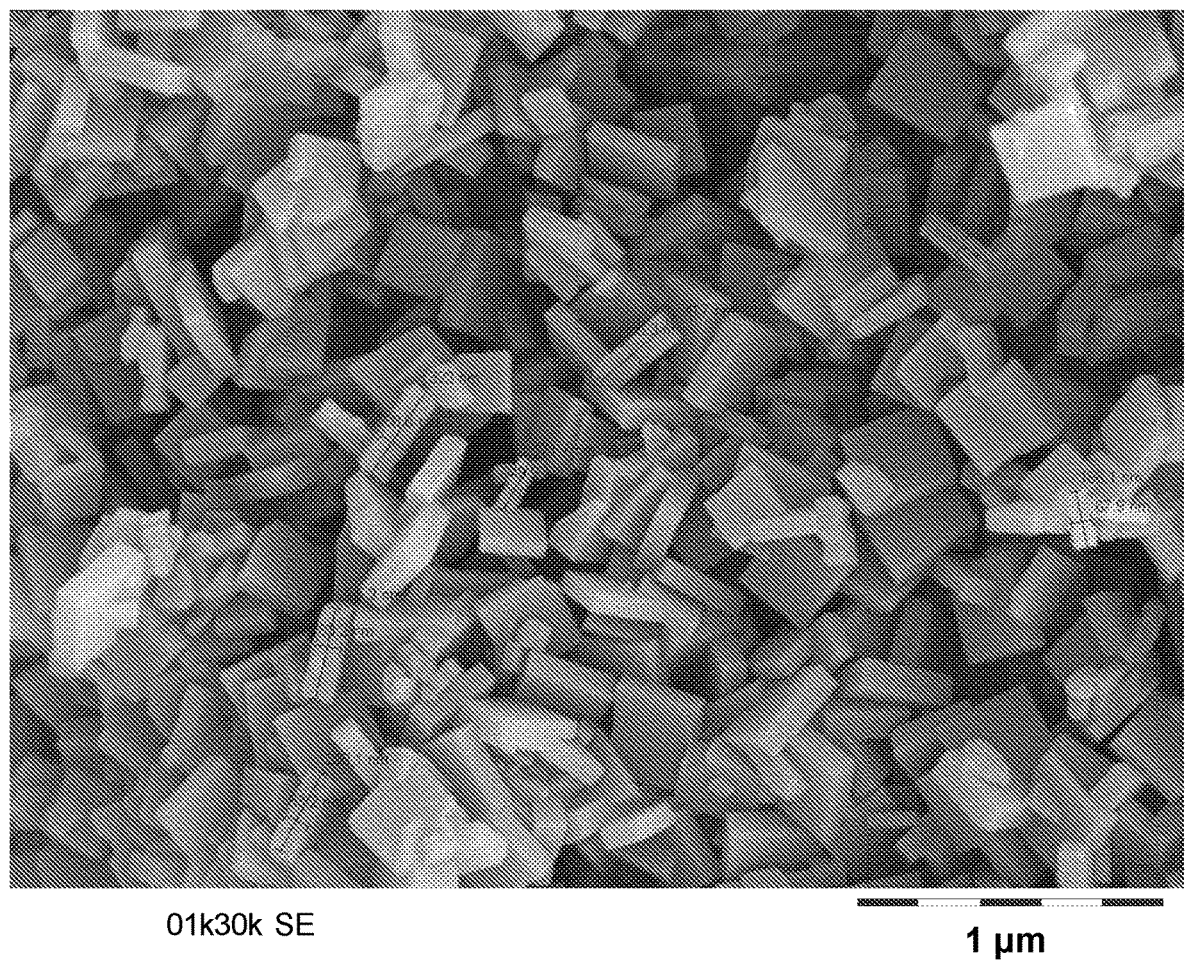
FIG. 9 shows SEM images of H-AEI seeds employed in examples 1-7, wherein the scale of 1 μm is indicated below the respective image. Furthermore, the manual assessment of the aspect ratio for individual primary crystallites is indicated in the figure.

Example 1: Synthesis of SSZ-39 Displaying a High Aspect Ratio 50 g commercial Y zeolite (from Qilu Huaxin Industry; SAR: 26), 10.0 g NaOH, and 2.5 g H-AEI seeds (from China Catalyst Group (CCG)) were pre-mixed in a mortar by hand. The H-AEI seeds employed for the synthesis displayed a crystallinity as determined by XRD of 92% and consisted of 100% of the AEI phase, displayed a composition as obtained from elemental analysis of 40 wt. % Si, 3.7 wt. % Al, <0.01 wt. % Al and <0.1 wt. % C, displayed a BET surface area of 617 m$^2$/g, a micropore volume (from t-plot analysis) of 0.28 ml/g, and displayed an aspect ratio of 3.56 (see SEM in FIG. 9). Then, 54.0 g of 1,1,3,5-tetramethylpiperidinium hydroxide (TMPOH, 24% aqueous solution; from CCG) with a trans:cis isomer ratio content of 0.18 were slowly added and mixed into the mixture thus forming a thick paste. The mixture having a mass of 114.2 g was then placed in an autoclave and heated for 120 h at 140° C. in a drying oven.

Work-Up:

The pasty product was removed from the autoclave and placed on a filter for suction filtration and then washed with 5 L of distilled water and then dried.

The dried product was then placed in a porcelain dish and heated with a constant temperature rampe over 7 h to 450° C., held at that temperature for 2 h, then heated with a constant temperature rampe over 30 min to 500° C., held at that temperature for 2 h, then heated with a constant temperature rampe over 30 min to 550° C., and held at that temperature for 2 h. After letting the reaction product cool back to room temperature, 29.2 g of a crystalline material was obtained.

Elemental analysis: Si, 39 wt. %, Al, 4.9 wt. %, Na, 2.3 wt. %, C<0.1 wt. %. XRD analysis indicated a total crystallinity of 88% with 95% AEI, 2% GME and 3% analcime.

Figure 1:
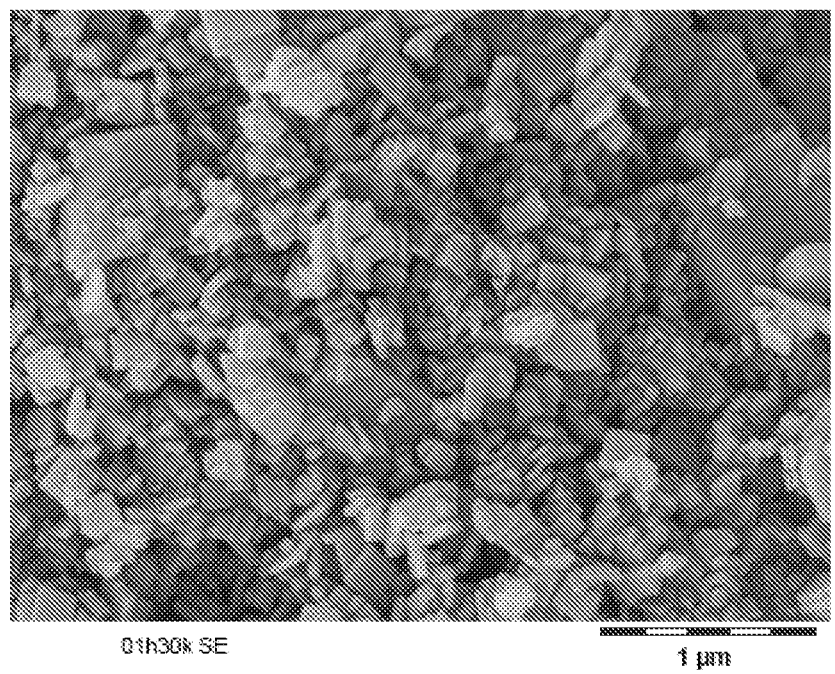
FIG. 1 shows SEM images of SSZ-39 obtained according to Example 1, wherein the scale of 1 μm is indicated below the respective image. Furthermore, the manual assessment of the aspect ratio for individual primary crystallites is indicated in the figures, respectively.
Figure 1:
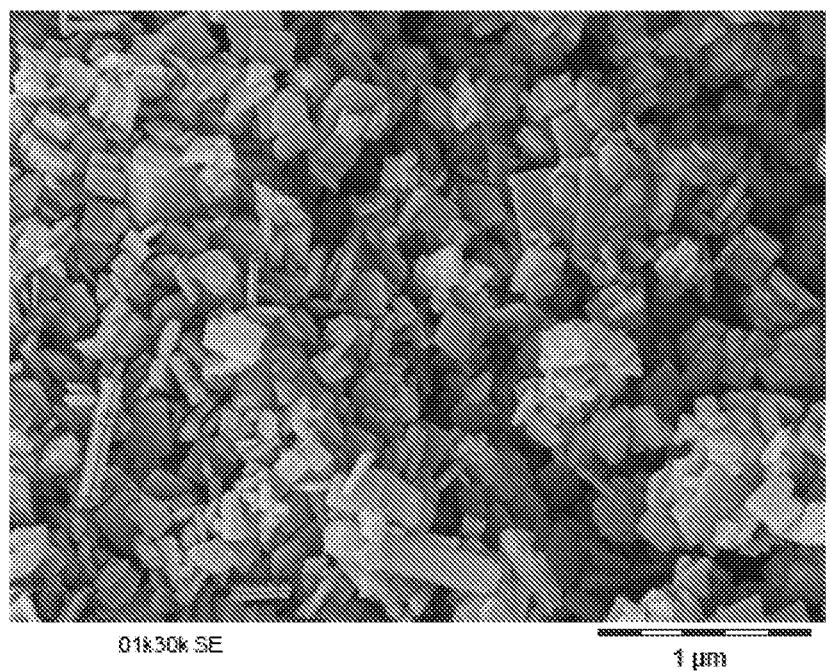

The aspect ratio was determined via SEM analysis, wherein two of the SEM images which were used indicating the assessment of the aspect ratio of manually selected primary crystals are shown in FIG. 1. In total, manual assessment of the aspect ratio of 154 different primary crystals in the sample via SEM was performed for affording a mean aspect ratio of 4.32.

Example 2: Synthesis of SSZ-39 Displaying a High Aspect Ratio 50 g commercial Y zeolite (from Qilu Huaxin Industry; SAR: 26), 10.0 g NaOH(s), and 2.5 g H-AEI seeds (same as employed in example 1) were pre-mixed and pre-ground in a Microton mill. Then, 54.0 g of 1,1,3,5-tetramethylpiperidinium hydroxide (TMPOH, 24% aqueous solution; from CCG) with a trans:cis isomer ratio content of 0.18 were slowly added and mixed into the mixture thus forming a thick paste. The mixture having a mass of 112.8 g was then placed in an autoclave and heated for 120 h at 140° C. in a drying oven.

Work-Up:

The pasty product was removed from the autoclave and placed on a filter for suction filtration and then washed with 5 L of distilled water and then dried.

The dried product was then placed in a porcelain dish and heated with a constant temperature rampe over 7 h to 450° C., held at that temperature for 2 h, then heated with a constant temperature rampe over 30 min to 500° C., held at that temperature for 2 h, then heated with a constant temperature rampe over 30 min to 550° C., and held at that temperature for 2 h. After letting the reaction product cool back to room temperature, 28.0 g of a crystalline material was obtained. Elemental analysis Si 39 wt. %, Al 4.8 wt. %, Na 2.1 wt. %, C<0.1 wt. %. XRD analysis indicated a total crystallinity of 89% with 99% AEI, 2% GME.

Figure 2:
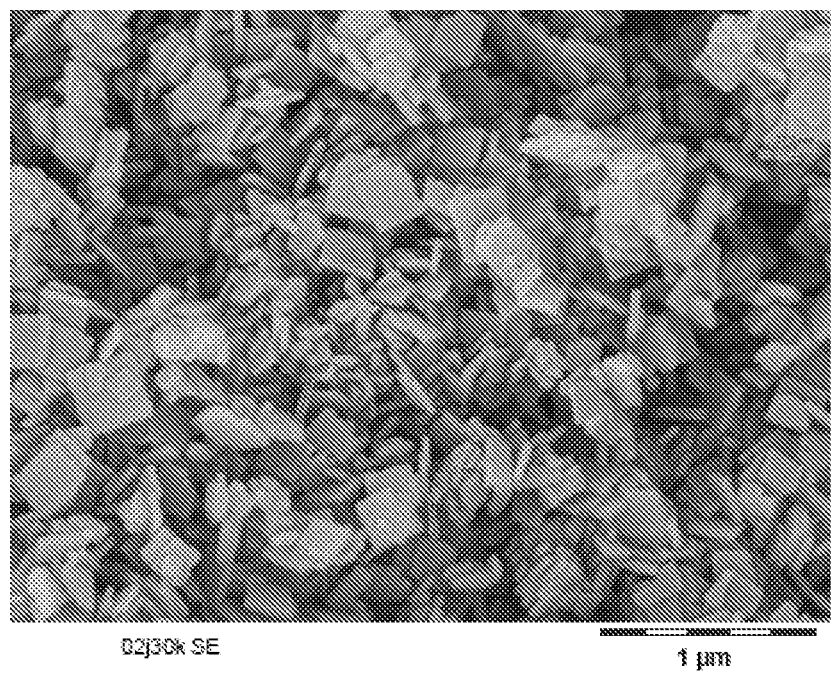
FIG. 2 shows SEM images of SSZ-39 obtained according to Example 2, wherein the scale of 1 μm is indicated below the respective image. Furthermore, the manual assessment of the aspect ratio for individual primary crystallites is indicated in the figures, respectively.
Figure 2:
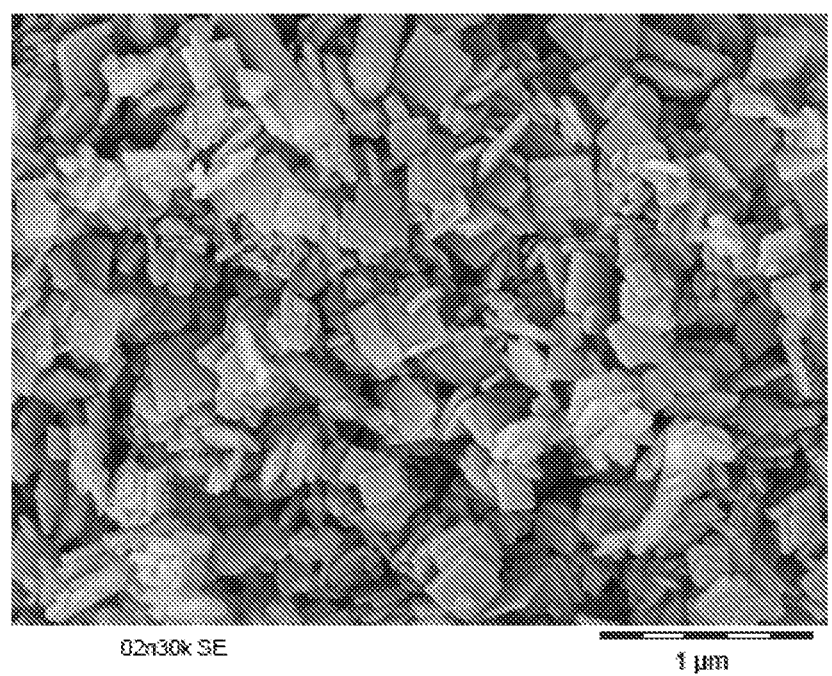

The aspect ratio was determined via SEM analysis, wherein two of the SEM images which were used indicating the assessment of the aspect ratio of manually selected primary crystals are shown in FIG. 2. In total, manual assessment of the aspect ratio of 119 different primary crystals in the sample via SEM was performed for affording a mean aspect ratio of 6.02

Example 3: Synthesis of SSZ-39 Displaying a High Aspect Ratio 50 g commercial Y zeolite (from Qilu Huaxin Industry; SAR: 34), 10.0 g NaOH(s), and 2.5 g H-AEI seeds (same as employed in example 1) were pre-mixed in a beaker by hand. Then, 54.0 g of 1,1,3,5-tetramethylpiperidinium hydroxide (TMPOH, 24% aqueous solution; from CCG) with a trans:cis isomer ratio content of 0.18 were slowly added and mixed into the mixture thus forming a thick paste. The mixture having a mass of 113.7 g was then placed in an autoclave and heated for 120 h at 140° C. in a drying oven.

Work-Up:

The pasty product was removed from the autoclave and placed on a filter for suction filtration and then washed with 5 L of distilled water and then dried.

The dried product was then placed in a porcelain dish and heated with a constant temperature rampe over 7 h to 450° C., held at that temperature for 2 h, then heated with a constant temperature rampe over 30 min to 500° C., held at that temperature for 2 h, then heated with a constant temperature rampe over 30 min to 550° C., and held at that temperature for 2 h. After letting the reaction product cool back to room temperature, 30.7 g of a crystalline material was obtained. Elemental analysis: Si, 37 wt. %, Al, 3.7 wt. %, Na, 1.5 wt. %, C<0.1 wt. %. XRD analysis indicated a total crystallinity of 92% with 97% AEI, 0.5% GME and 2.5% analcime.

Figure 3:
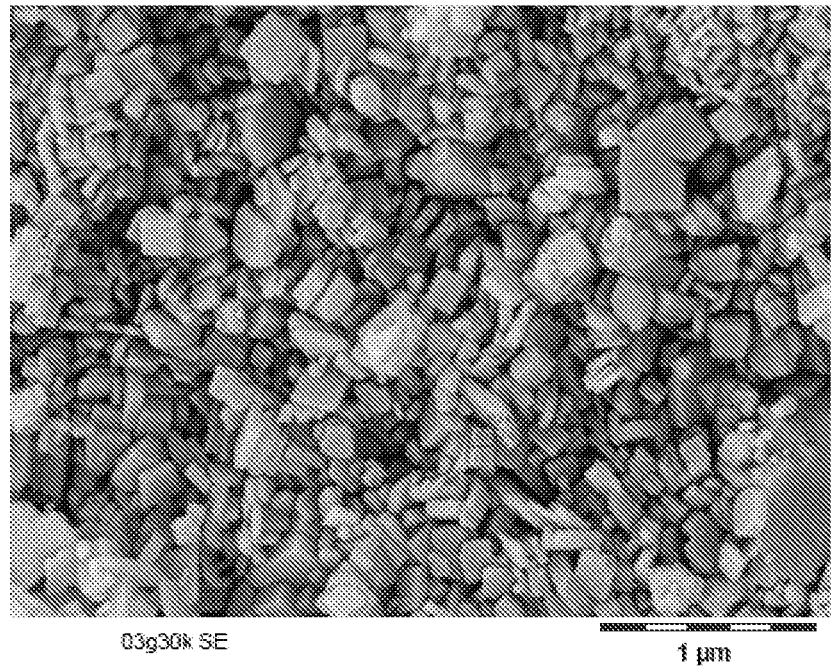
FIG. 3 shows SEM images of SSZ-39 obtained according to Example 3, wherein the scale of 1 μm is indicated below the respective image. Furthermore, the manual assessment of the aspect ratio for individual primary crystallites is indicated in the figures, respectively.
Figure 3:
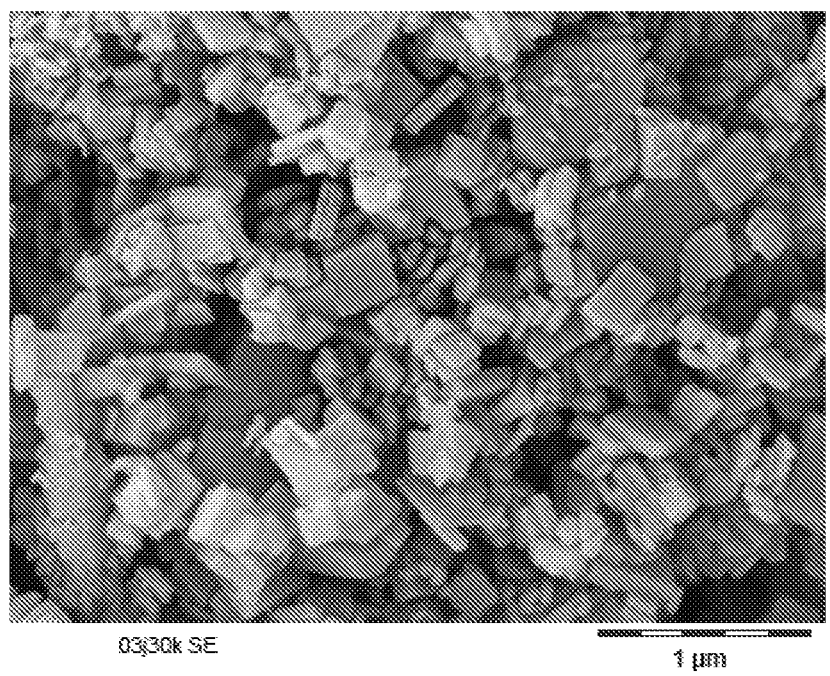

The aspect ratio was determined via SEM analysis, wherein two of the SEM images which were used indicating the assessment of the aspect ratio of manually selected primary crystals are shown in FIG. 3. In total, manual assessment of the aspect ratio of 130 different primary crystals in the sample via SEM was performed for affording a mean aspect ratio of 4.33.

Example 4: Synthesis of SSZ-39 Displaying a High Aspect Ratio 50 g commercial Y zeolite (from Qilu Huaxin Industry; SAR: 34), 10.0 g NaOH(s), and 2.5 g H-AEI seeds (same as employed in example 1) were pre-mixed in a beaker by hand Then, 54.0 g of 1,1,3,5-tetramethylpiperidinium hydroxide (TMPOH, 24% aqueous solution; from CCG) with a trans:cis isomer ratio content of 0.18 were slowly added and mixed with the zeolite. By thoroughly mixing by hand, a homogeneous and rather dry paste was obtained. The paste was then placed in a Microton mill and further mixed, as a result of which the paste became liquid in consistency, and droplets of liquid formed on the surface of the glass. When opening the mill thereafter, a slight rise in pressure was noticeable. The mixture having a mass of 100.8 g was then placed in an autoclave and heated for 120 h at 140° C. in a drying oven.

Work-Up:

The pasty product was removed from the autoclave and placed on a filter for suction filtration and then washed with 5 L of distilled water and then dried.

The dried product was then placed in a porcelain dish and heated with a constant temperature rampe over 7 h to 450° C., held at that temperature for 2 h, then heated with a constant temperature rampe over 30 min to 500° C., held at that temperature for 2 h, then heated with a constant temperature rampe over 30 min to 550° C., and held at that temperature for 2 h. After letting the reaction product cool back to room temperature, 24.9 g of a crystalline material was obtained. Elemental analysis Si 39 wt. %, Al 3.7 wt. %, Na 1.0 wt. %, C<0.1 wt. %. XRD analysis indicated a total crystallinity of 91% with 100% AEI.

Figure 4:
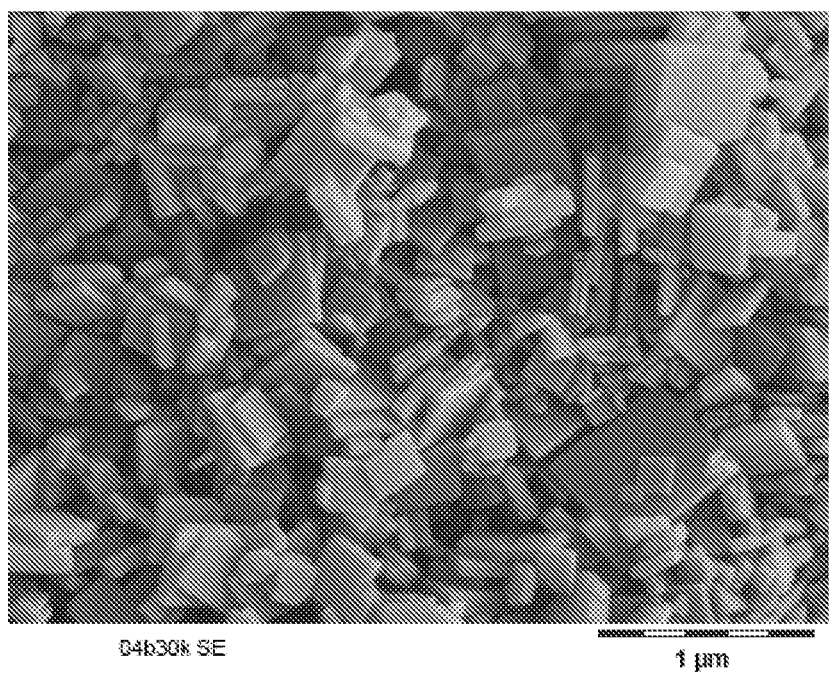
FIG. 4 shows SEM images of SSZ-39 obtained according to Example 4, wherein the scale of 1 μm is indicated below the respective image. Furthermore, the manual assessment of the aspect ratio for individual primary crystallites is indicated in the figures, respectively.
Figure 4:
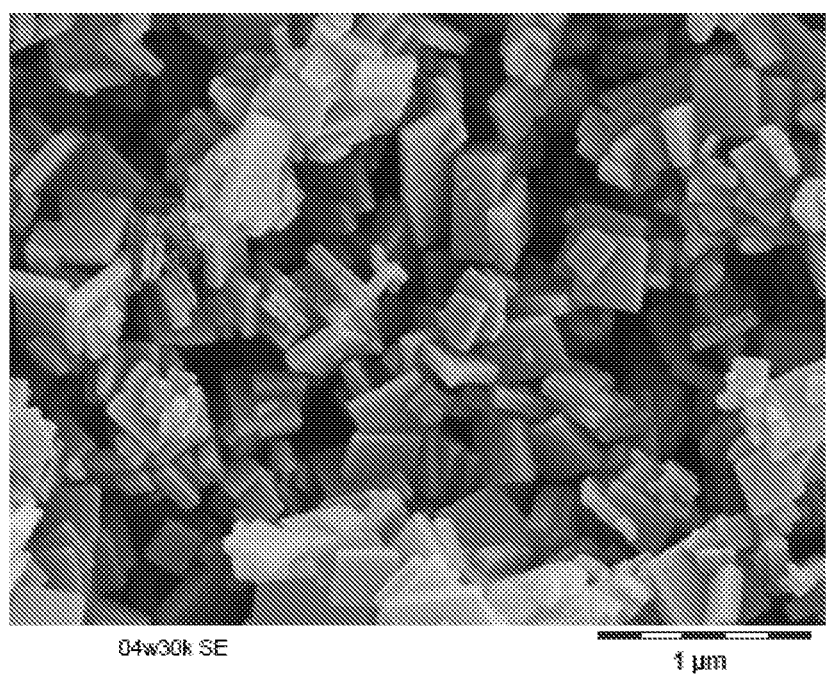

The aspect ratio was determined via SEM analysis, wherein two of the SEM images which were used indicating the assessment of the aspect ratio of manually selected primary crystals are shown in FIG. 4. In total, manual assessment of the aspect ratio of 116 different primary crystals in the sample via SEM was performed for affording a mean aspect ratio of 4.32

Example 5: Synthesis of SSZ-39 Displaying a High Aspect Ratio 50 g commercial Y zeolite (from Qilu Huaxin Industry; SAR: 26), 10.0 g NaOH(s), and 2.5 g H-AEI seeds (same as employed in example 1) were pre-mixed by hand. Then, 54.2 g of 1,1,3,5-tetramethylpiperidinium hydroxide (TMPOH, 24% aqueous solution; from BASF) having an isomer ratio trans:cis of 0.17) were slowly added and mixed in a beaker and then placed in a Microton mill. The mixture having a mass of 95.1 g was then placed in an autoclave and heated for 137 h at 140° C. in a drying oven.

Work-Up:

The pasty product was removed from the autoclave and placed on a filter and then washed five times with 0.5 L of distilled water with the aid of a centrifuge. The product was then pre-dried over night at 60° C.

The dried product was then placed in a porcelain dish and heated with a constant temperature rampe over 7 h to 450° C., held at that temperature for 2 h, then heated with a constant temperature rampe over 30 min to 500° C., held at that temperature for 2 h, then heated with a constant temperature rampe over 30 min to 550° C., and held at that temperature for 2 h. After letting the reaction product cool back to room temperature, a crystalline material was obtained. XRD analysis indicated a total crystallinity of 92% with 93% AEI, 1% Y zeolite and 6% analcime.

Figure 5:
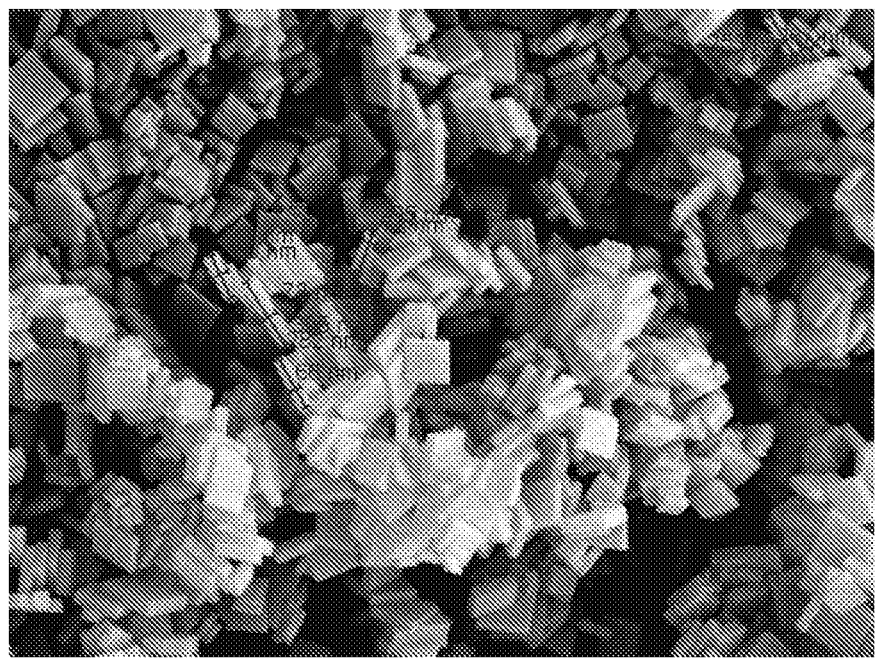
FIG. 5 shows SEM images of SSZ-39 obtained according to Example 5, wherein the scale of 1 μm is indicated below the respective image. Furthermore, the manual assessment of the aspect ratio for individual primary crystallites is indicated in the figures, respectively.
Figure 5:
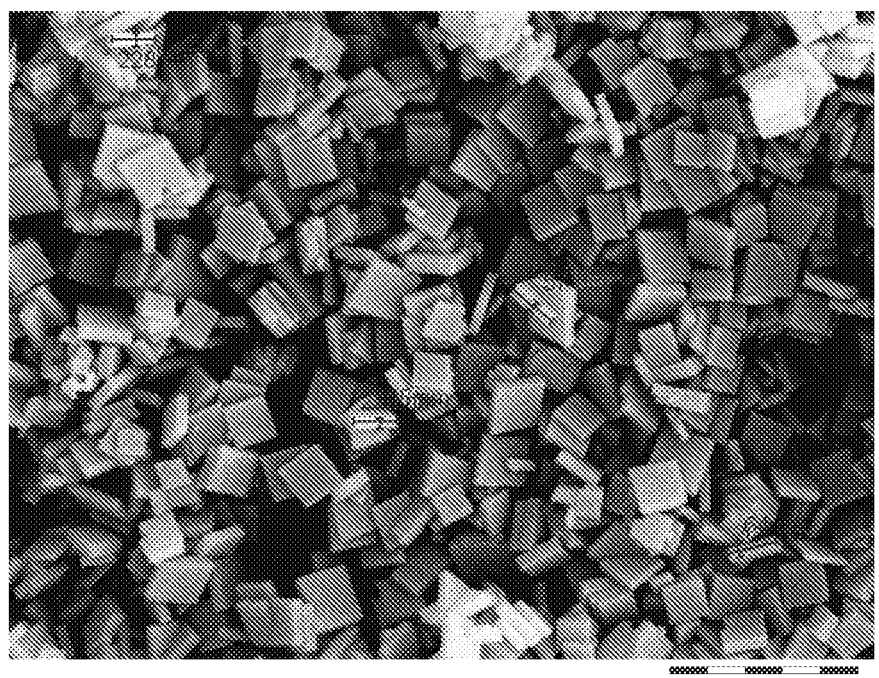

The aspect ratio was determined via SEM analysis, wherein two of the SEM images which were used indicating the assessment of the aspect ratio of manually selected primary crystals are shown in FIG. 5. In total, manual assessment of the aspect ratio of 121 different primary crystals in the sample via SEM was performed for affording a mean aspect ratio of 3.79.

Example 6: Synthesis of SSZ-39 Displaying a High Aspect Ratio 50 g commercial Y zeolite (from Qilu Huaxin Industry; SAR: 26), 10.0 g NaOH(s), and 2.5 g H-AEI seeds (same as employed in example 1) were pre-mixed in a mortar by hand. Then, 54.0 g of 1,1,3,5-tetramethylpiperidinium hydroxide (TMPOH; 20% aqueous solution; from CCG) with a trans:cis isomer ratio content of 0.18 were slowly added and mixed into the mixture thus forming a thick paste. The mixture having a mass of 114.2 g was then placed in an autoclave and heated for 120 h at 140° C. in a drying oven.
Work-up:

The pasty product was removed from the autoclave and placed on a filter for suction filtration and then washed with 5 L of distilled water and then dried.

The dried product was then placed in a porcelain dish and heated with a constant temperature rampe over 7 h to 450° C., held at that temperature for 2 h, then heated with a constant temperature rampe over 100 min to 500° C., held at that temperature for 2 h, then heated with a constant temperature rampe over 100 min to 550° C., and held at that temperature for 2 h. After letting the reaction product cool back to room temperature, 29.2 g of a crystalline material was obtained.

Elemental analysis of the product afforded: 36 wt. % Si, 4.7 wt. % Al, 1.5 wt. % Na, and <0.1 wt. % C. The material displayed a BET surface area of 600 m²/g.

Figure 10:
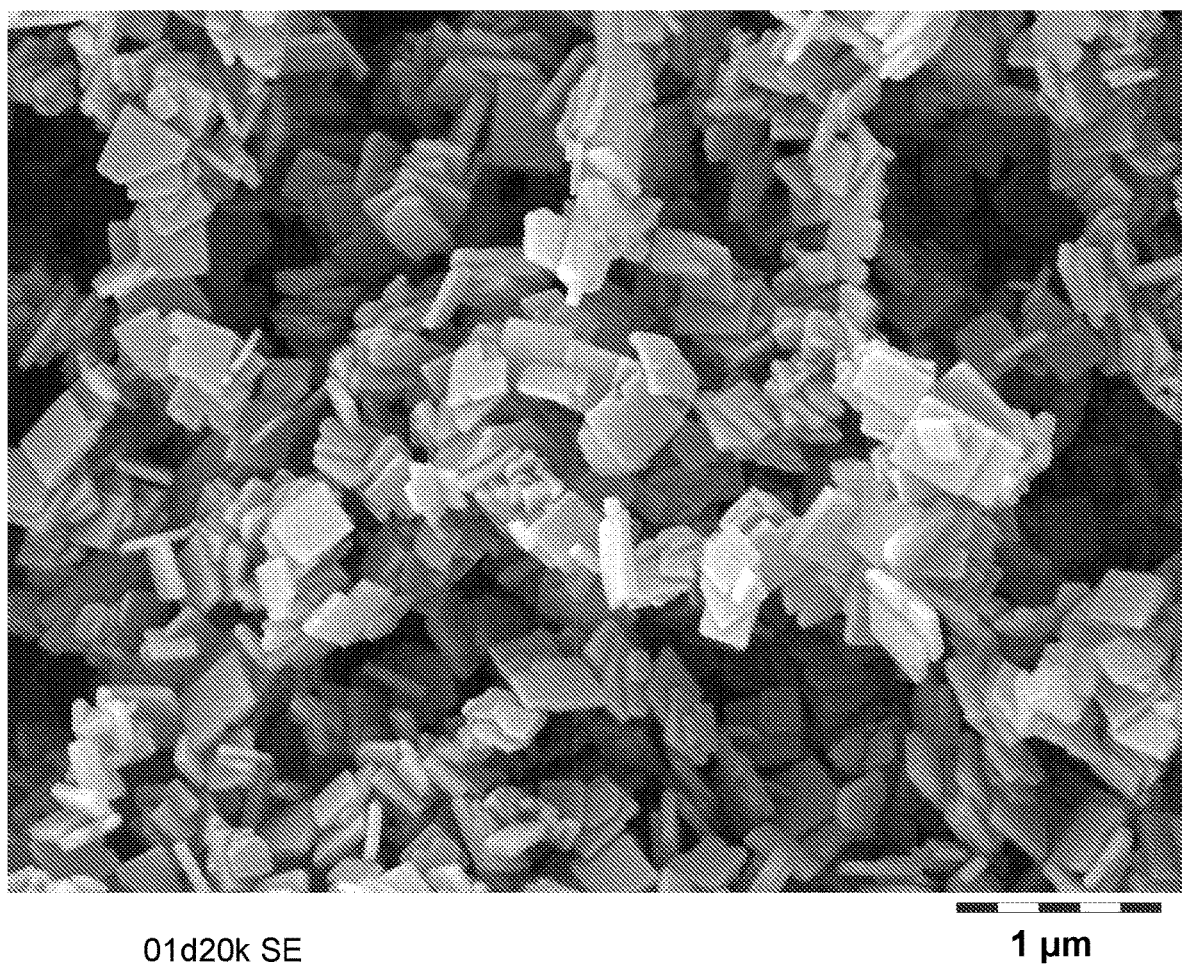
FIG. 10 shows an SEM image of SSZ-39 obtained according to example 6, wherein the scale of 1 μm is indicated in the lower right hand corner of the image.

An SEM image of the product is shown in FIG. 10.

Example 7: Synthesis of SSZ-39 Displaying a High Aspect Ratio 50 g commercial Y zeolite (from Qilu Huaxin Industry; SAR: 34), 10.0 g NaOH(s), and 2.5 g H-AEI seeds (same as employed in example 1) were pre-mixed in a mortar by hand. Then, 54.0 g of 1,1,3,5-tetramethylpiperidinium hydroxide (TMPOH; 24% aqueous solution; from CCG) with a trans:cis isomer ratio content of 0.18 were slowly added and mixed into the mixture thus forming a thick paste. The mixture having a mass of 114.2 g was then placed in an autoclave and heated for 120 h at 140° C. in a drying oven.
Work-up:

The pasty product was removed from the autoclave and placed on a filter for suction filtration and then washed with 5 L of distilled water and then dried.

The dried product was then placed in a porcelain dish and heated with a constant temperature rampe over 7 h to 450° C., held at that temperature for 2 h, then heated with a constant temperature rampe over 100 min to 500° C., held at that temperature for 2 h, then heated with a constant temperature rampe over 100 min to 550° C., and held at that temperature for 2 h. After letting the reaction product cool back to room temperature, 29.2 g of a crystalline material was obtained.

Elemental analysis of the product afforded: 38 wt. % Si, 3.7 wt. % Al, 0.77 wt. % Na, <0.1 wt. % C. The material displayed a BET surface area of 640 m²/g.

Figure 11:
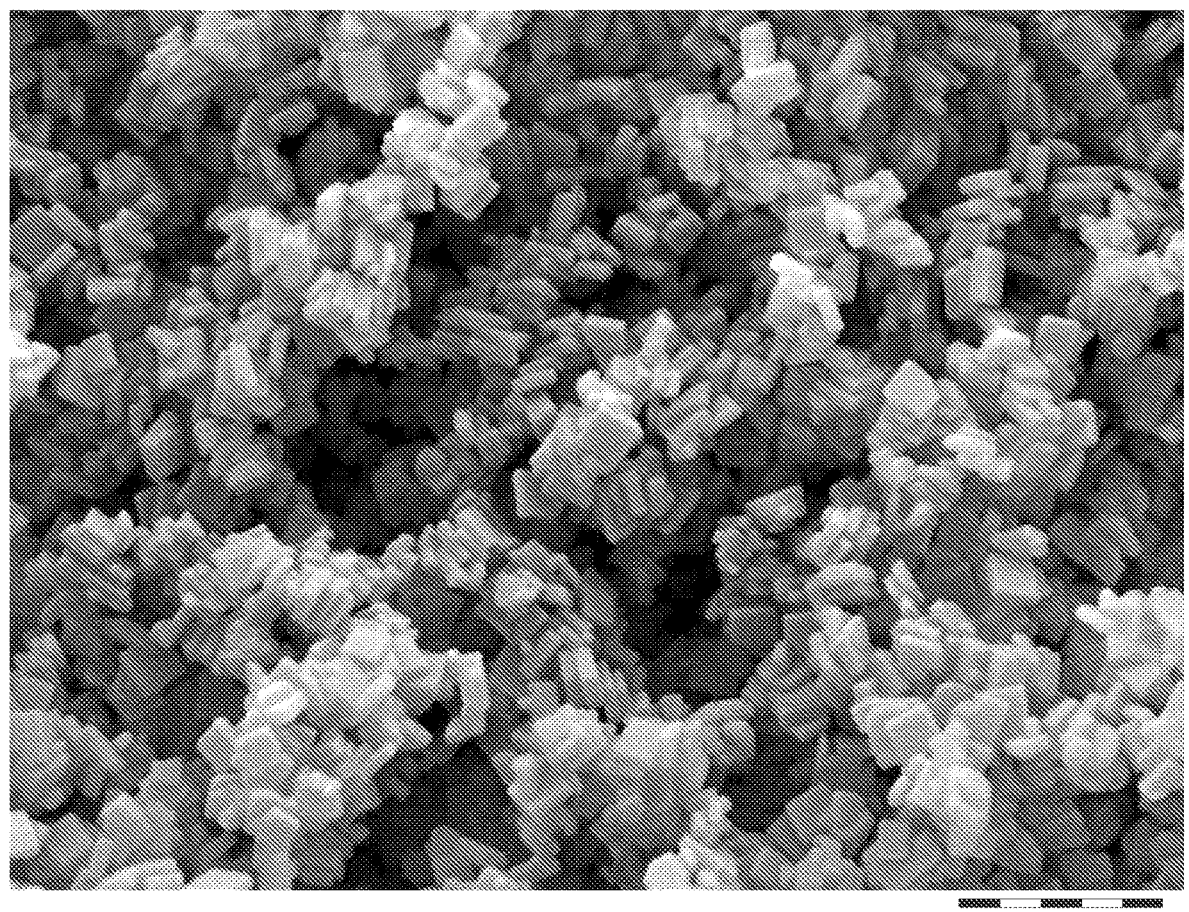
FIG. 11 shows an SEM image of SSZ-39 obtained according to example 7, wherein the scale of 1 μm is indicated in the lower right hand corner of the image.

An SEM image of the product is shown in FIG. 11.

Comparative Example 1: Synthesis of SSZ-39 Displaying a Conventional Aspect Ratio 1 g of Y zeolite (Si/Al=10.8), 0.7 g of template (50% (aq), TMAOH), 0.35 g of NaOH and 0.02 g of uncalcined SSZ-39 zeolite seeds were mixed together. After grinding for 5-7 min, the powder mixture was transferred to an autoclave and sealed. After heating at 140° C. for 72 hours, the sample was completely crystallized. The resulting crystalline product of SSZ-39 displayed an Si:Al molar ratio of 5.0 as determined by inductively coupled plasma.

Figure 6:
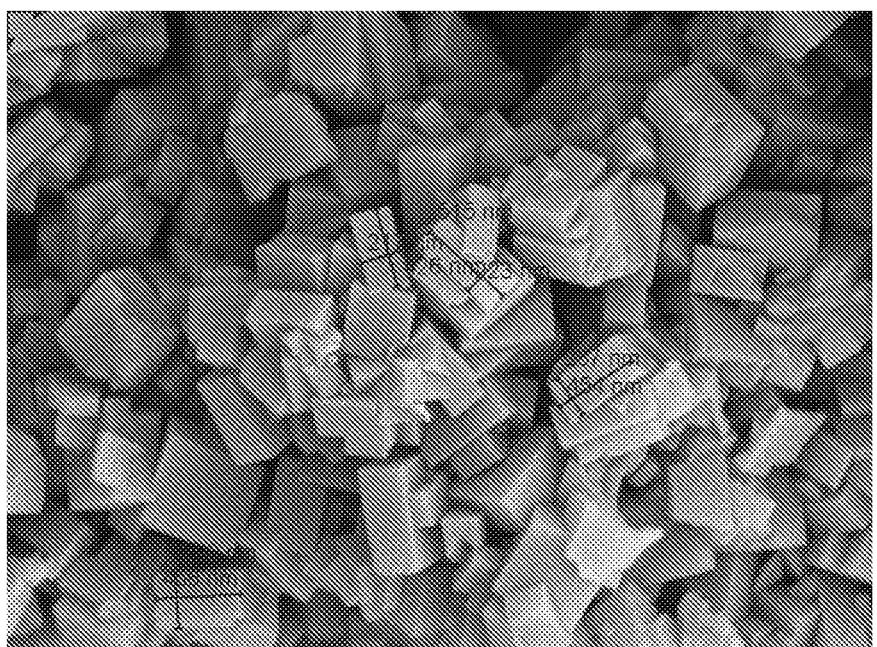
FIG. 6 shows SEM images of SSZ-39 obtained according to Comparative Example 1, wherein the scale of 1 μm is indicated below the respective image. Furthermore, the manual assessment of the aspect ratio for individual primary crystallites is indicated in the figures, respectively.
Figure 6:
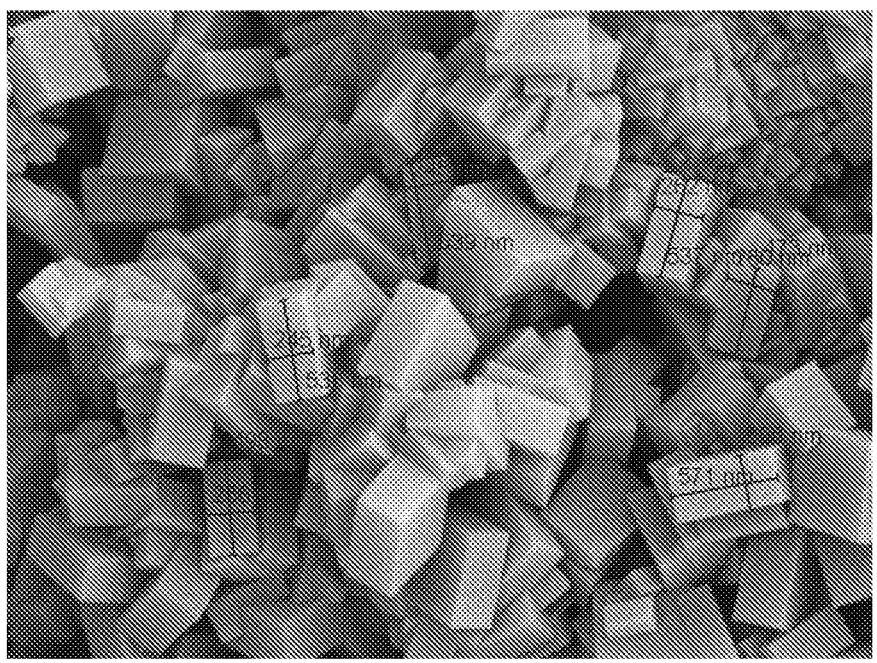
Figure 7:
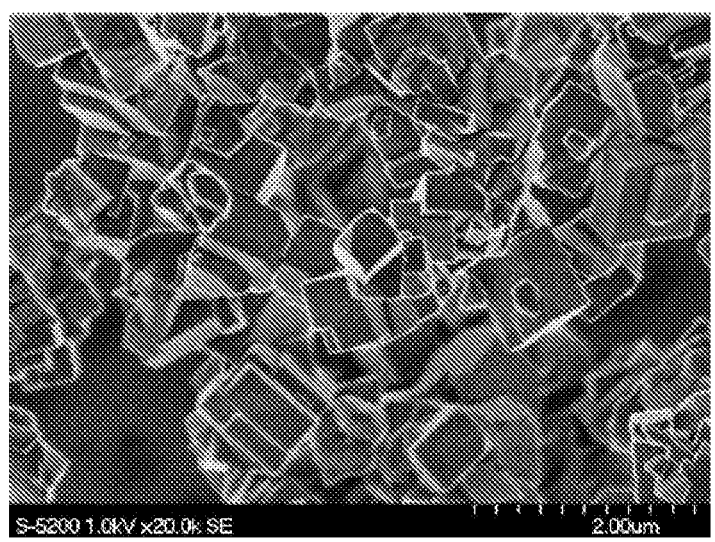
FIG. 7 shows an SEM image of SSZ-39 obtained according to Comparative Example 2, wherein the scale of 2.00 μm is indicated in the lower right hand corner of the image.

The aspect ratio was determined via SEM analysis, wherein two of the SEM images which were used indicating the assessment of the aspect ratio of manually selected primary crystals are shown in FIG. 6. In total, manual assessment of the aspect ratio of 121 different primary crystals in the sample via SEM was performed for affording a mean aspect ratio of 2.11.

Comparative Example 2: Synthesis of SSZ-39 According to Example 4 of WO 2018/113566 A1

For repeating Example 4 of WO 2018/113566 A1, 1 g of zeolite Y (Si/Al=10.8) containing H₂O (0.625 g of Y and 0.375 g H₂O), 0.7 g of template (40 wt.-% aqueous solution of N,N-dimethyl-2,6-dimethylpiperridinium hydroxide), 0.35 g of NaOH and 0.02 g of uncalcined SSZ-39 zeolite seeds were mixed together for affording a reaction mixture which contained 137 wt.-% of H₂O based on 100 wt.-% of SiO₂ contained in the zeolite Y of the mixture. After grinding for 5-7 min, the powder mixture was transferred to an autoclave and sealed. After heating at 140° C. for 72 hours, the sample was completely crystallized. The obtained sample was calcined at 550° C. for 5 hours to remove the template. The H-form of the sample was prepared by triple ion-exchange with 1 M NH₄NO₃ solution at 80° C. for 1 h and calcination at 550° C. for 5 h. The resulting crystalline product of SSZ-39 displayed an Si:Al molar ratio of 5.0 as determined by inductively coupled plasma.

Comparative Example 3: Synthesis of SSZ-39(N) Using Quaternary Ammonium Containing Structure Directing Agent The following synthesis of SSZ-39(N) is based on the synthetic methodologies described in U.S. Pat. No. 5,958, 370 and M. Moliner et al. in Chem. Commun. 2012, 48, pages 8264-8266.

Synthesis of
N,N-dimethyl-3,5-dimethylpiperidinium Hydroxide (Nitrogen Containing Compound Structure Directing Agent)

N,N-dimethyl-3,5-dimethylpiperidinium hydroxide was prepared as described in M. Moliner et al., Chem. Comm., 2012, 48, 8264-8266 as detailed in the Electronic Supplementary Information (ESI) thereof, under heading 1.1.2.1—SSZ-39-OSDA Synthesis.
Synthesis of SSZ-39(N)

4 g of a solution of the above obtained N,N-dimethyl-3, 5-dimethylpiperidinium hydroxide (0.56 mmol OH⁻/g) is mixed with 6.1 g of water and 0.20 g of aqeuous 1.0 M NaOH solution. 0.25 g of Ammonium exchanged Y zeolite (JRC-HY-5.3; Si/Al$_2$O$_3$=5.3; JGC Catalysts and Chemicals Ltd.) is added to this solution and, finally, 2.5 g of Fumed Silica (Cab-O-Sil M5D) is added. The thus obtained mixture has the molar composition: 1 Si: 0.05 Al: 0.15 OSDA: 0.45 Na: 30 H$_2$O.

The resulting mixture is then sealed in an autoclave and heated at 150° C. and stirred at 30 rpm for 3 days. After pressure release and cooling to room temperature the SSZ-39(N) product was obtained having a SiO$_2$/Al$_2$O$_3$ mole ratio of 40.

The thus obtained SSZ-39(N) product was then calcined in air in a muffle furnace at 600° C. for 6 hours which provided the Na—SSZ-39(N).

Subsequently, the Na—SSZ-39(N) was then NH$_4^+$ ion exchanged using NH$_4$NO$_3$ by treating a 1:1 mixture of the Na—SSZ-39(N): NH$_4$NO$_3$ by slurrying in water in a weight ratio of water: Na—SSZ-39 of 25-50:1 at 95° C. for 2 hours, followed by filtration to provide NH$_4^+$ SSZ-39(N).

The thus obtained NH$_4^+$ SSZ-39(N) was then calcined in air in a muffle furnace at 600° C. for 3 hours which provided the H-form, H—SSZ-39(N).

The XRD for the H—SSZ-39(N) is provided in FIG. 1.

Comparative Example 4: Preparation of an AEI Zeolitic Material 20.194 kg of distilled water were placed in a 60 L autoclave reactor and stirred at 200 rpm. 2.405 kg of a solution of 50 wt.-% NaOH in distilled water were then added followed by the addition of 6.670 kg of 1,1,3,5-tetramethylpiperidinium hydroxide. 560 g of zeolite Y seeds (N H$_4$-zeolite Y; CBV-500 from Zeolyst) were then suspended in 3 L of distilled water and the suspension was the added to the reactor while stirring, after which 7.473 kg of Ludox® AS40 (Grace; colloidal silica; aqueous solution, 40 weight-%) were added. The resulting mixture displaying molar ratios of 1.00 SiO$_2$: 0.30 Na$_2$O: 0.17 template: 0.19 zeolite Y: 41.5 H$_2$O was further stirred for 30 min at room temperature, after which the reactor was closed and the reaction mixture was heated under autogenous pressure in 1.5 h to 160° C. and subsequently maintained at that temperature for 48 h while further stirring.

The resulting suspension was filled into five 10 L canisters and the suspension allowed to settle, after which the clear supernatant was decanted off. The solid residue was placed in a filter and washed with distilled water to <200 µS. The filter cake was then dried at 120° C. over night to afford 1.1848 kg of a crystalline solid, which was subsequently heated at 2° C./min to 500° C. and calcined at that temperature for 5 hours under air. After said calcination, the calcined zeolitic material was subject to a further calcination step, wherein it was heated at 2° C./min to 550° C. and calcined at that temperature for 5 h to afford 1.0810 kg of the sodium form of a zeolitic material. X-ray diffraction analysis of the zeolitic material revealed an AEI type framework structure. The Na-AEI zeolite displayed a BET surface area as obtained from the nitrogen isotherms of 506 m$^2$/g and a Langmuir surface area of 685 m$^2$/g.

Elemental analysis of the resulting Na-AEI zeolite afforded values of 34 wt.-% of Si, 5.1 wt.-% of Al, and 2 wt.-% of Na. Accordingly the zeolite displayed an SiO$_2$:Al$_2$O$_3$ molar ratio of 12.9.

Figure 8:
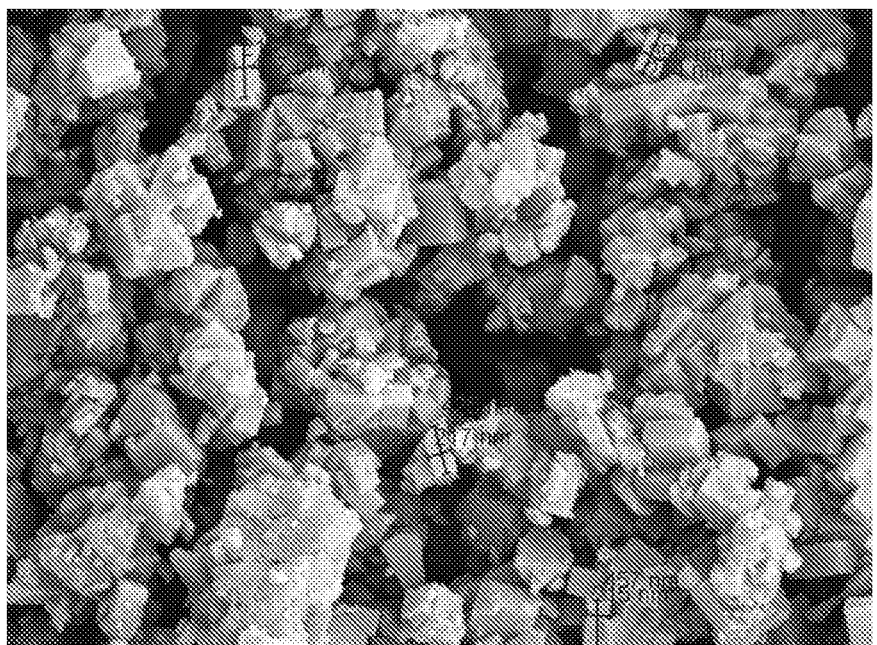
FIG. 8 shows SEM images of SSZ-39 obtained according to Comparative Example 4, wherein the scale of 2 μm is indicated below the respective image. Furthermore, the manual assessment of the aspect ratio for individual primary crystallites is indicated in the figures, respectively.
Figure 8:
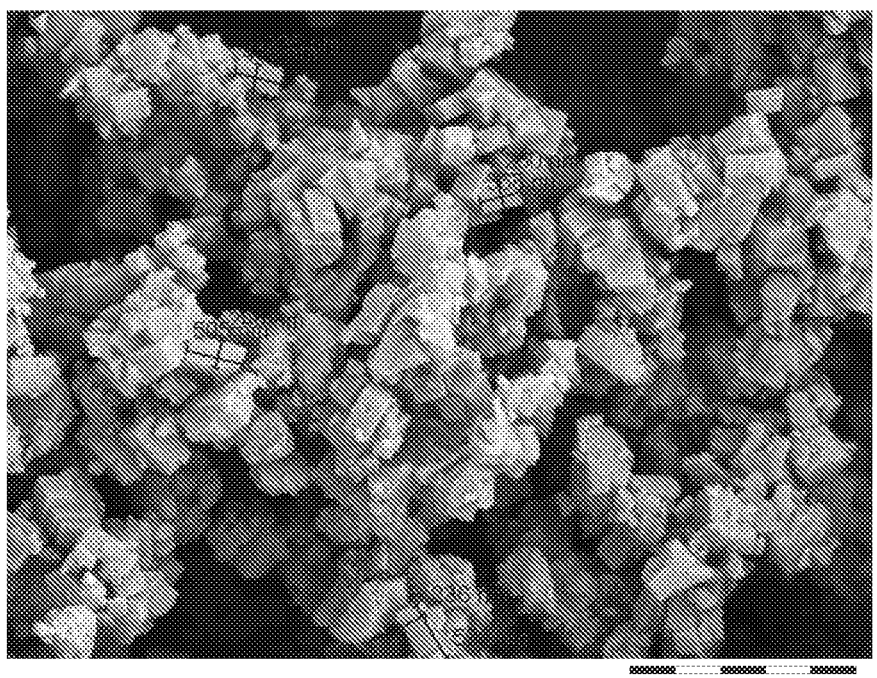

The aspect ratio was determined via SEM analysis, wherein two of the SEM images which were used indicating the assessment of the aspect ratio of manually selected primary crystals are shown in FIG. 8. In total, manual assessment of the aspect ratio of 118 different primary crystals in the sample via SEM was performed for affording a mean aspect ratio of 1.94.

Example 8: MTO Catalytic Testing

Testing was conducted in a tubular reactor with heatable mantle. 10 g of a ground catalyst sample (fraction 1—1.6 mm) and 2-3 mm steatite beads (as inert material) were placed into the reactor. The reactor bed consisted of:
reactor exit: 4 cm steatite beads (ca. 5 ml)
catalyst bed: 10 g catalyst
reactor entrance: filled to 6 cm before the end of the reactor Methanol (ca. 30% in nitrogen) was guided through a saturator (60° C.) with cooling spiral (40° C.) to a pre-evaporator (200° C.) and then through the reactor (400-500° C.) at a WHSV of about 0.8 for 24 h, and the gas produced in the reactor was then continuously analyzed with a gas chromatograph.

Using the aforementioned experimental set-up, the sample from example 5 was tested and compared to the performance observed with the H-AEI which was used as seeding material in the synthetic procedures of examples 1-7. The results from catalytic testing are described in the table below:

|  | Sel. $_{C2}$ % av. 24 h | Sel. $_{C3}$ % av. 24 h | C$_2$/C3 | Sel.$_{C2}$% >5 h | Sel. $_{C3}$ % >5 h | C2/C3 >5 h |
|---|---|---|---|---|---|---|
| example 5 | 25.4 | 31.9 | 0.8 | 32.1 | 38.9 | 0.8 |
| commercial H-AEI | 35.4 | 19.5 | 1.8 | 36.6 | 16.3 | 2.2 |

Thus, as may be taken from the results presented in the table, it has quite unexpectedly been found that when used as a catalyst in the methanol to olefin reaction, the inventive zeolitic material leads to more that twice the selectivity towards propylene than when using a zeolitic material according to the prior art. In particular, it is tentatively assumed that said highly surprising advantages are due to the shorter diffusion paths in the primary crystals, in particular along the uniquely shorter axis of the inventive materials.

Example 9: SCR Catalytic Testing 22.4 g ammonium nitrate and 200 g distilled water were placed in a 500 ml flask and the ammonium nitrate dissolved under stirring at 80° C. 22.4 g of the zeolitic material from example 6 were then added together with 24 g distilled water and the mixture was stirred at 80° C. for 2 h at 200 rpm. The solid product was then filtered off and washed with distilled water to electroneutrality of the washing solution (<200 µS/cm$^3$). The solid was then dried over night at 120° C. and calcined by heating to 450° C. at 1° C./min and calcining at that temperature for 6 h, thus affording 26.4 g of ion exchanged zeolite displaying a composition as obtained from elemental analysis of: 4.4 wt.-% Al, 0.04 wt.-% Na, and 35 wt.-% Si. The material was then wet impregnated with an aqueous copper nitrate solution (incipient wetness impregnation). The material was then dried and calcined at 450° C. for 5 h for affording a zeolitic material loaded with 5.5 wt.-% of copper calculated as CuO.

20.7 g ammonium nitrate and 180 g distilled water were placed in a 500 ml flask and the ammonium nitrate dissolved under stirring at 80° C. 20.7 g of the zeolitic material from example 7 were then added together with 27 g distilled water and the mixture was stirred at 80° C. for 2 h at 200 rpm. The solid product was then filtered off and washed with distilled water to electroneutrality of the washing solution (<200 µS/cm$^3$). The solid was then dried over night at 120° C. and calcined by heating to 450° C. at 1° C./min and calcining at that temperature for 6 h, thus affording 22.7 g of ion exchanged zeolite displaying a composition as obtained from elemental analysis of: 3.4 wt.-% Al, <0.01 wt.-% Na, and 36 wt.-% Si. The material was then wet impregnated with an aqueous copper nitrate solution (incipient wetness impregnation). The material was then dried and calcined at 450° C. for 5 h for affording a zeolitic material loaded with 4.3 wt.-% of copper calculated as CuO.

The zeolitic materials which had been loaded with copper as described above, were then respectively shaped by preparing an aqueous slurry to which zirconium acetate was added as binder material precursor (5 weight-% based on zeolitic material). The slurry was then shaped to a tablet, dried under stirring and calcined for 1 h at 550° C. The respectively obtained tablet was then crushed and sieved to a particle size in the range of from 250 to 500 micrometer. The catalyst was then aged for 50 h at 650° C. in 10% steam/air, and for 16 h at 800° C. in 10% steam/air. Standard SCR conditions were applied by subjecting the catalytic material to a gas stream (500 ppm NO, 500 ppm NH$_3$, 5% H$_2$O, 10% O$_2$, balance N$_2$) at a gas hourly space velocity of 80,000 h$^{-1}$, at temperatures of the gas stream of 200° C., 400° C., 575° C. (first run for degreening); and 175° C., 200° C., 225° C., 250° C., 300° C., 450° C., 550° C., 575° C. The amount of the catalytic material was adjusted to 120 mg per reactor; the material was diluted with corundum to about 1 ml volume. The space velocities simulated 1 mL of a coated catalyst.

Figure 12:
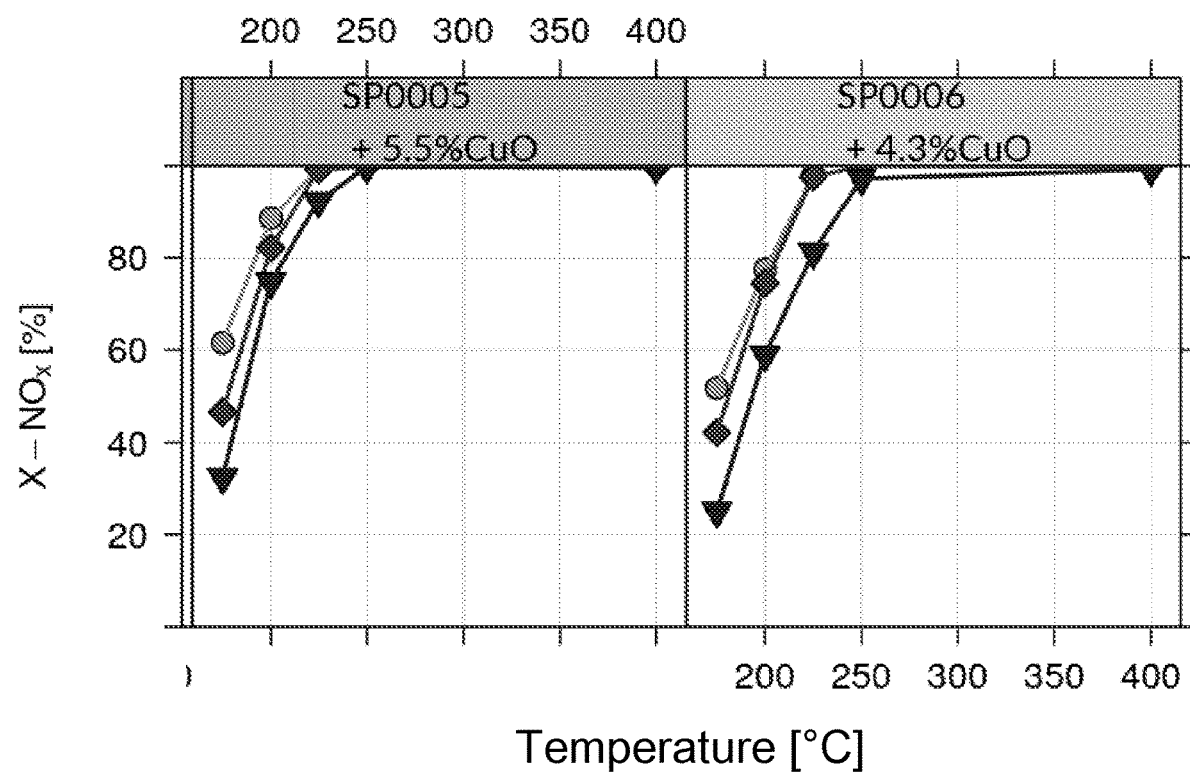
FIG. 12 displays the results from SCR testing performed on the zeolitic materials obtained from examples 6 and 7 after copper exchange and shaping thereof according to example 9, respectively, wherein the shaped body obtained with the material from example 6 is designated as "SP0005" and the shaped body obtained with the material from example 7 is designated as "SP0006". In the figure, the temperature at which the SCR testing was performed is shown along the abscissa, and the $NO_x$ conversion in % is shown along with ordinate. The testing values for the fresh catalyst is shown as "●" for the material aged for 50 h at 650° C. is shown as "◆" and for the material aged for 16 h at 820° C. is shown as "▼".
Figure 13:
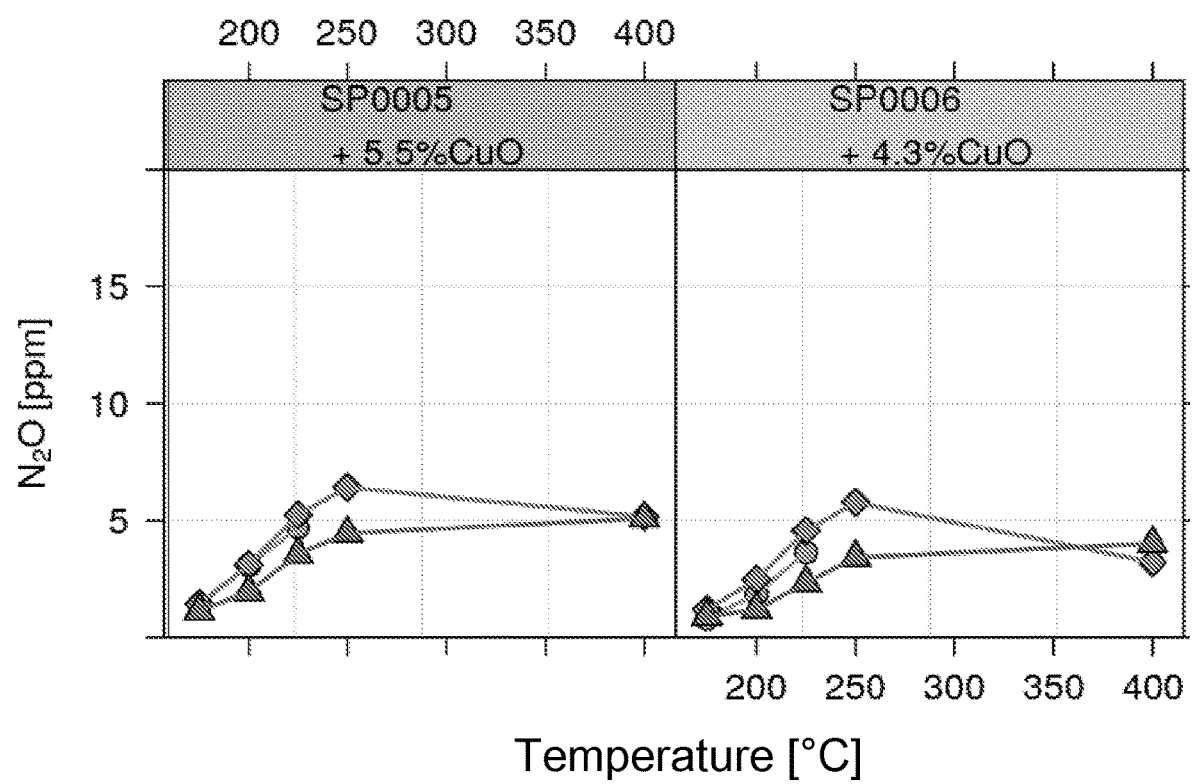
FIG. 13 displays the results for the $N_2O$ make during SCR testing performed on the zeolitic materials obtained from examples 6 and 7 after copper exchange and shaping thereof according to example 9, respectively, wherein the shaped body obtained with the material from example 6 is designated as "SP0005" and the shaped body obtained with the material from example 7 is designated as "SP0006". In the figures, the temperature at which the SCR testing was performed is shown along the abscissa, and the $N_2O$ make in % is shown along with ordinate. The testing values for the fresh catalyst is shown as "●" for the material aged for 50 h at 650° C. is shown as "◆" and for the material aged for 16 h at 820° C. is shown as "▲".

The results of the SCR tests are shown in FIGS. 12 and 13, wherein the shaped body obtained with the material from example 6 is designated as "SP0005" and the shaped body obtained with the material from example 7 is designated as "SP0006". More specifically, FIG. 12 shows the results depending on the temperature of the catalyst testing for the fresh zeolitic material (●) for the material aged for 50 h at 650° C. (♦) and for the material aged for 16 h at 820° C. (▼). FIG. 13, on the other hand, displays the N$_2$O make during SCR, wherein the results are again shown depending on the temperature of the catalyst testing for the fresh zeolitic material (●) for the material aged for 50 h at 650° C. (♦) and for the material aged for 16 h at 820° C. (▲).

The results from SCR testing relative to the NO$_x$ conversion is shown in the table below for testing of the shaped bodies at 200° C., respectively.

| SCR testing | | NO$_x$ conversion [%] | |
| --- | --- | --- | --- |
| temperature | aging | Example 6 | Example 7 |
| 200° C. | none | 89 | 78 |
| 200° C. | 50 h at 650° C. | 82 | 74 |
| 200° C. | 16 h at 820° C. | 75 | 59 |

Thus, as may be taken from the results from SCR testing, the inventive materials display excellent performance in SCR, both with regard to high NO$_x$ conversion and low N$_2$O make both in the fresh and aged states.

CITED PRIOR ART

U.S. Pat. No. 5,958,370
Moliner, M. et al. in Chem. Commun. 2012, 48, pages 8264-8266
Maruo, T. et al. in Chem. Lett. 2014, 43, page 302-304
Martin, N. et al. in Chem. Commun. 2015, 51, 11030-11033
Dusselier, M. et al. in ACS Catal. 2015, 5, 10, 6078-6085
US 2015/0118150 A1
WO 2016/149234 A1
Ransom, R. et al. in Ind. Eng. Chem. Res. 2017, 56, 4350-4356
WO 2018/113566 A1

The invention claimed is:

1. A process for preparing a zeolite material having an AEI-framework structure wherein the framework structure comprises SiO$_2$ and X$_2$O$_3$ and X is a trivalent element, and wherein the process comprises:
   (1) preparing a mixture comprising one or more cationic structure directing agent comprising a heterocyclic amine ring, seed crystals, and a first zeolite material comprising SiO$_2$ and X$_2$O$_3$ in the framework structure and having an FAU framework structure, wherein (1) comprises milling the mixture; and
   (2) heating the mixture to obtain a second zeolite material comprising SiO$_2$ and X$_2$O$_3$ in its framework structure and having the AEI framework structure;
   wherein the mixture prepared in (1) and heated in (2) contains 1000 wt.-% or less of H$_2$O based on 100 wt.-% of SiO$_2$ in the framework structure of the first zeolite material,
   wherein the mixture prepared in (1) and heated in (2) further comprises at least one OH source, and an OH$^-$:SiO$_2$ molar ratio of OH$^-$ to SiO$_2$ in the framework structure of the first zeolite material is in a range from 0.3 to 0.4,
   wherein the one or more cationic structure directing agents are chosen from N,N-di(C$_1$-C$_4$)alkyl-3,5-di(C$_1$-C$_4$)alkylpyrrolidinium, N,N-di(C$_1$-C$_4$)alkyl-3,5-di(C$_1$-C$_4$)alkylpiperidinium, N,N-di(C$_1$-C$_4$)alkyl-3,5-di(C$_1$-C$_4$)alkylhexahydroazepinium, and combinations thereof, and
   wherein a molar ratio of trans isomer to cis isomer in the one or more cationic structure directing agents relative to alkyl groups at 3 and 5 positions of the heterocyclic amine ring ranges from 0.01 to 0.3,
   Wherein X is chosen from Al, B, In, Ga and combinations thereof.

2. The process of claim 1, wherein the heating in (2) is conducted at a temperature ranging from 80° C. to 250° C.

3. The process of claim 1, wherein the heating in (2) is conducted under autogenous pressure.

4. The process of claim 1, further comprising calcining the second zeolite material.

5. The process of claim 1, further comprising ion-exchanging the second zeolite material.

6. The process of claim 5, wherein at least one ionic extra-framework element contained in the zeolite framework is ion-exchanged against one or more cations chosen from Sr, Zr, Cr, Mg, Mo, Fe, Co, Ni, Cu, Zn, Ru, Rh, Pd, Ag, Os, Ir, Pt, Au, and combinations thereof.

7. The process of claim 1, wherein primary crystals of the zeolitic material have a mean aspect ratio greater than 3.6.

* * * * *

UNITED STATES PATENT AND TRADEMARK OFFICE
CERTIFICATE OF CORRECTION

| | | |
|---|---|---|
| PATENT NO. | : 12,239,965 B2 | Page 1 of 1 |
| APPLICATION NO. | : 17/309182 | |
| DATED | : March 4, 2025 | |
| INVENTOR(S) | : Andrei-Nicolae Parvulescu et al. | |

It is certified that error appears in the above-identified patent and that said Letters Patent is hereby corrected as shown below:

On the Title Page

Insert the following:
--(30) Foreign Application Priority Data
November 16, 2018 (CN)............PCT/CN2018/115895--

Signed and Sealed this
Second Day of December, 2025

John A. Squires
*Director of the United States Patent and Trademark Office*